(12) United States Patent
Lee et al.

(10) Patent No.: US 11,036,539 B2
(45) Date of Patent: Jun. 15, 2021

(54) WORKFLOW ENGINE FRAMEWORK

(71) Applicant: Electronics and Telecommunications Research Institute, Daejeon (KR)

(72) Inventors: Yeon Hee Lee, Daejeon (KR); Hyun Jae Kim, Incheon (KR); Ho Sung Lee, Daejeon (KR); Dae Won Kim, Daejeon (KR); Hyun Joong Kang, Jinju-si (KR); Soon Hyun Kwon, Incheon (KR); Woong Shik You, Sejong-si (KR); Nae Soo Kim, Daejeon (KR); Sun Jin Kim, Daejeon (KR); Young Min Kim, Daejeon (KR); Hoo Young Ahn, Daejeon (KR); Cheol Sig Pyo, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 288 days.

(21) Appl. No.: 15/963,547

(22) Filed: Apr. 26, 2018

(65) Prior Publication Data

US 2019/0114200 A1 Apr. 18, 2019

(30) Foreign Application Priority Data

Oct. 18, 2017 (KR) .......................... 10-2017-0135066
Apr. 24, 2018 (KR) .......................... 10-2018-0047370

(51) Int. Cl.
*G06F 9/46* (2006.01)
*G06F 8/34* (2018.01)
(Continued)

(52) U.S. Cl.
CPC .............. *G06F 9/46* (2013.01); *G06F 3/0484* (2013.01); *G06F 8/34* (2013.01); *G06Q 10/06* (2013.01);
(Continued)

(58) Field of Classification Search
None
See application file for complete search history.

(56) References Cited

U.S. PATENT DOCUMENTS 9,575,749 B1 2/2017 Howard et al.
2006/0149698 A1* 7/2006 Haselden ........... G06Q 10/0633
(Continued)

FOREIGN PATENT DOCUMENTS

JP 2008-27282 2/2008
KR 10-2015-0070606 6/2015
(Continued)

OTHER PUBLICATIONS

Diimitrios Georgakopoulos et al.; "An Overview of Workflow Management: From Process Modeling to Workflow Automation Infrastructure"; Distributed and Parallel Databases, vol. 3, 1995, pp. 119-153.
Yeon Hee Lee et al.; "KSB Knowledge-converged AI framework", IoT Korea Exhibition & International Conference 2017, Oct. 12, 2017.

*Primary Examiner* — Qing Yuan Wu
(74) *Attorney, Agent, or Firm* — Kile Park Reed & Houtteman PLLC

(57) ABSTRACT

A workflow engine framework for creating a single-domain adaptive and a cross-domain adaptive workflow performing platform is disclosed. The workflow engine framework includes: a resource management unit configured to manage resources including engine components and workflow property specification components; a system configuration unit configured to create an engine by assembling the property specification components; and a system control unit config-
(Continued)

ured to drive and execute one or more engines. Further the workflow engine framework is allocated to each of two or more different signal domains and forms a cross-domain adaptive workflow engine framework.

13 Claims, 20 Drawing Sheets

(51) Int. Cl.
    *G06F 3/0484* (2013.01)
    *G06Q 10/06* (2012.01)
    *G06F 16/2455* (2019.01)

(52) U.S. Cl.
    CPC ..... *G06Q 10/0631* (2013.01); *G06Q 10/0633* (2013.01); *G06F 16/24568* (2019.01)

(56) References Cited

U.S. PATENT DOCUMENTS

| | | |
|---|---|---|
| 2010/0077069 A1 | 3/2010 | Kim |
| 2013/0253977 A1* | 9/2013 | Vibhor .................. H04L 47/70 |
| | | 705/7.26 |
| 2015/0039382 A1 | 2/2015 | Kim |
| 2016/0364211 A1 | 12/2016 | Chau et al. |
| 2018/0084073 A1 | 3/2018 | Walsh et al. |

FOREIGN PATENT DOCUMENTS

| | | |
|---|---|---|
| KR | 10-2016-0146088 | 12/2016 |
| WO | 2016/160626 | 10/2016 |

\* cited by examiner

WORKFLOW ENGINE FRAMEWORK

CROSS-REFERENCE TO RELATED APPLICATION

This application claims priority to and the benefit of Korean Patent Application No. 2017-0135066, filed on Oct. 18, 2017 and also Korean Patent Application No. 2018-0047370, filed on Apr. 24, 2018, the disclosures of which are incorporated herein by reference in its entirety.

BACKGROUND

1. Field of the Invention

The present invention relates to workflow and framework technology, and particularly, to a workflow engine framework capable of creating a single-domain adaptive and also a cross-domain adaptive workflow performing platform through systematic configuration of dynamic engine components in order to process workflows of various work domains or target domains.

2. Discussion of Related Art

Workflow technology refers to automation technology for business processes in which documents, information, tasks, etc. are transferred from one user (one application) to another user in order to process them according to a series of business procedure rules. In particular, a data-based service workflow creation procedure is as follows. First, a data source and a method of collecting the data source are determined. A method of processing the collected data and a method of analyzing the processed data (e.g., analysis by machine learning, prediction, knowledge-based inference, etc.) are determined. A method of servicing the analysis result is determined. An engine(s) necessary for performing the corresponding workflow is/are configured, and then a method of linking the engines is defined. By doing so, the workflow creation procedure is completed.

Recently, intelligent Internet of Things (IoT) technology that gives artificial intelligence to various objects has been attracting attention. In particular, for intelligent Internet applications (e.g., Smart City) encompassing a large number of heterogeneous IoT domains, there is a need for a system capable of regulating, managing, and controlling heterogeneous object intelligence domains. In addition, problems can arise that require intelligent processing of various work domains (e.g., energy, health, transportation, education, power plants, etc.). Even within a single work domain, there can be a variety of target domains, ranging from a device that creates data and performs actions to an Edge that processes, transfers, instantly analyzes, and determines data and a Cloud that performs complicated analysis and applications. Also, within the work domain or the target domain, there may be a spatial domain according to spatial classification and a time domain according to temporal classification. In addition, there may be various domains such as a data processing domain, a learning domain, a prediction domain, or a service domain. Therefore, there is a need for a unified method and system for effectively regulating, managing, and controlling such complicated multi-layered domains (hereinafter referred to as "cross domains").

On the other hand, various technologies have been developed to extract and analyze insights from IoT data and support quick and accurate decision-making in order to quickly extract insights contained in big data collected through IoT and apply the insights to business. This must necessarily be supported by stream processing technology for real-time analytics and platform technology for real-time prediction/analysis.

Also, as there is an increasing need to design a workflow by utilizing machine learning, which has lately been emerging, in IoT big data analysis and IoT domains of various objectives have been developed, there is a need for a unified platform technology capable of systematically integrating the domains to enable more insightful analysis or service. However, conventional workflow technology has limitations in combining machine learning with IoT big data, having different characteristics depending on devices, data, and domains.

SUMMARY OF THE INVENTION

In order to overcome the above-described limitations and problems, there is a need for a unified system capable of creating and performing a workflow according to the purpose of each domain through systematic configuration of engine components and of being easily applied to another domain to create and perform a (domain adaptive) workflow suitable for the other domain, and in particular, capable of performing integrated control and management in order to cope with a cross-domain.

Accordingly, the present invention intends to propose a workflow engine framework for creating a domain adaptive or even a cross-domain adaptive workflow performing platform suitable for purposes through systematic configuration of dynamic engine components.

According to one aspect of the present invention for addressing the objects of the present invention, there is provided a workflow engine framework including:

a resource management unit configured to manage resources including engine components and workflow property specification components needed to perform a workflow defined by a user;

a system configuration unit configured to create an engine by assembling the property specification components, dynamically combining the engine components needed to perform the workflow and configuring necessary engine component containers according to a workflow specification; and a system control unit configured to drive and control, according to a manner defined in a workflow property specification, the execution of one or more engines created by the system configuration unit.

Also, according to another aspect of the present invention, when the workflow engine framework is allocated to each of two or more different single domains, there is provided a cross-domain adaptive workflow engine framework including a cross-domain convergence system which is connected with the single-domain workflow engine frameworks over a network and which is configured to determine, according to a cross-domain workflow defined by a user, a single domain to which the engine is to be deployed from among single domains included in a cross domain.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
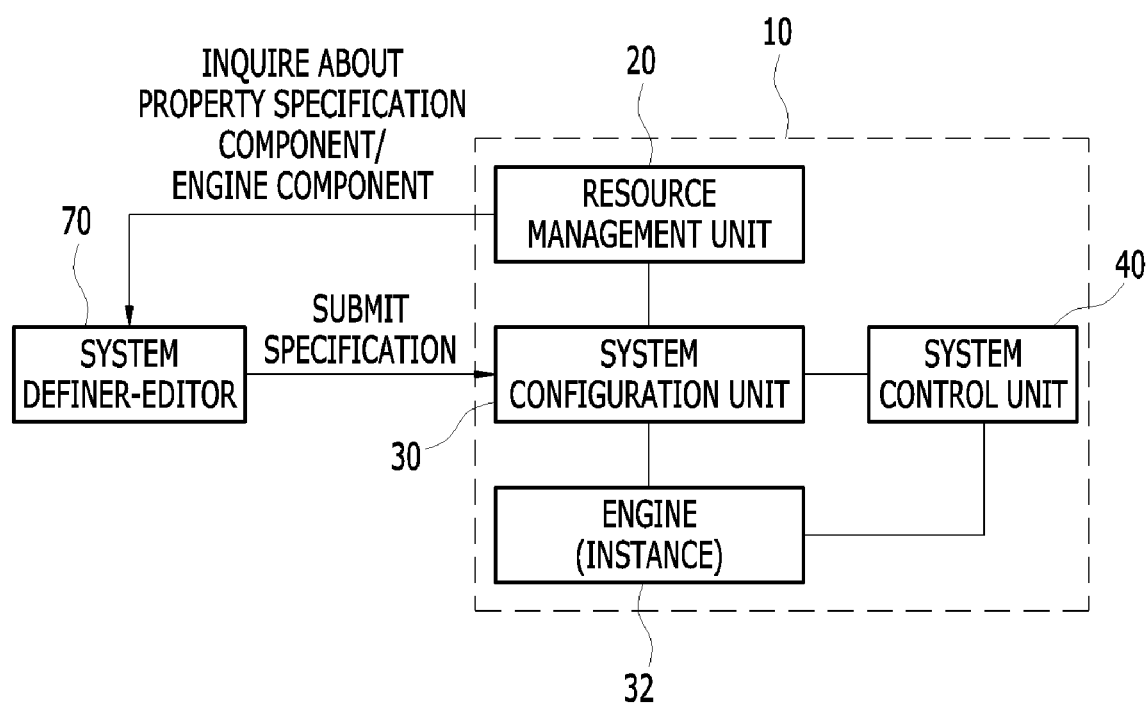
FIG. 1 is a schematic diagram of a workflow engine framework according to the present invention.

FIG. 1 is a block diagram showing an embodiment of a workflow engine framework according to the present invention. A workflow engine framework 10 according to the present invention basically includes:

a system definer-editor 70 configured to define and edit a structure and specifications of work to be done (workflow);

a resource management unit 20 configured to manage resources including: property specification components related to properties for defining engine components of a workflow specification (an engine specification, i.e., a specification consisting of one or more engines constituting the workflow) to be defined by a user through the system definer-editor 70, engine components which are engine composing elements forming an engine to perform the workflow, pre-defined workflow specification instances, etc.;

a system configuration unit 30 configured to assemble workflow property specifications and dynamically combine engine components needed to perform the workflow and to configure an engine instance(s) 32 (hereinafter interchangeably referred to as an engine) that performs the workflow;

an engine (instance) 32 created by the system configuration unit 30; and a system control unit 40 configured to control the resource management unit 20, the system configuration unit 30, and the engine 32.

In the workflow engine framework 10, a user defines a workflow consisting one or more engines to build a desired system. Here, the workflow is composed of definition of the one or more engines. The definition of the engines refers to a combination of an engine container for containing engine components and engine components to be contained in the engine container.

The engine component container is created as a combination of one or more reader components, writer components, runner components, operator components, and controller components. Each of the reader components, writer components, runner components, operator components, and controller components is created as a combination of a property specification component for defining properties for determining characteristics of components and an execution component corresponding to an actual implementation of components. As an example, the execution component corresponds to a class such as Java and C++, and the property specification component corresponds to a creator parameter that may be included in a creator of a class or a class containing creator parameters. By defining a workflow for one or more engines corresponding to definition of an execution system created in this way, it is possible to dynamically configure the executable engine and also to create a workflow system needed for various work domains.

Figure 2:
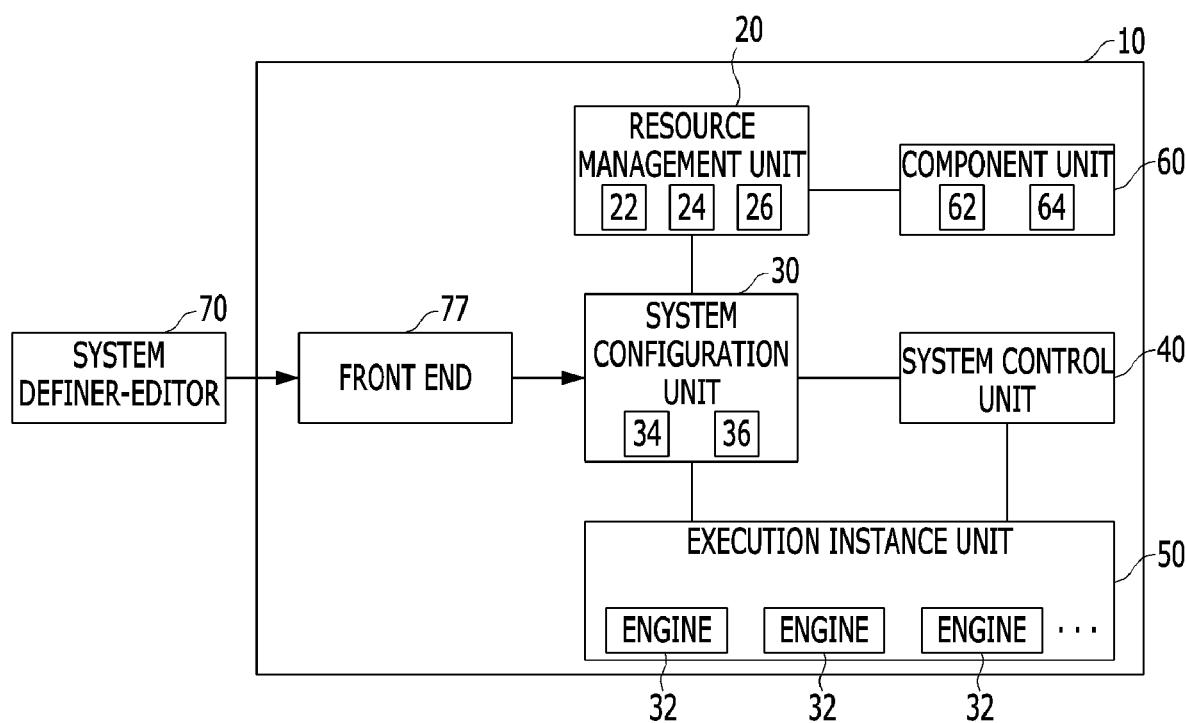
FIG. 2 is a detailed block diagram of a system configuration unit 30.

FIG. 2 shows a detailed configuration and additional elements of the system of FIG. 1.

The system may further include: an execution instance unit 50 in which engines 32 configured as a combination of engine components dynamically created by the system configuration unit 30 are created and managed in the form of engine instances (indicating, as a result, completed and executed engines); a component unit 60, which is a space where an engine component 64 and a property specification component 62 managed by the resource management unit 20 are physically or virtually stored; and a front end 77 configured to receive a workflow from the system definer-editor 70 and transfer the workflow to the system configuration unit 30.

The front end 77 serves to mediate execution of a process for receiving a request from a client and processing the received request, and serves to respond to various requests such as user management or storage management requests. Examples of the front end 77 may include a system including a general socket communication-based listener module, a general application server, or a web application server which provides a web-based REST API. Depending on the case, the front end 77 may run on a network different from that of a back end constituting the system definer-editor 70 or the framework 10.

Before the workflow engine framework 10 of FIG. 1 and FIG. 2 is described in full, the system definer-editor 70 that serves to write a workflow defining specifications for a series of operations to drive the execution system in the framework 10 and request the front end 77 to instruct that the execution system be driven in the framework 10 will be described first.

The system definer-editor 70 functions to define a detailed domain for a desired work, define a workflow structure to be performed for each domain, select an engine component(s) according to the structure to define a workflow performing flow, and write a detailed specification of each engine component. To this end, the system definer-editor 70 may inquire the framework (especially, the resource management unit 20) about property specification components and engine components.

Here, the workflow structure may, for example, indicate processes such as data collection from a specific IoT platform, data processing, learning, etc., and the sequential handling of those processes may correspond to a workflow performing flow. The specification of components refers to details defined for each element component, such as from which device data is to be collected, what connection method is to be used, whether to store received data in a memory or a storage, what memory information is to be used, where a storage is, etc. in order to perform a work about from which data is to be brought, how the data is to be processed, and to which the data is to be sent.

Through the system definer-editor 70, a user (e.g., a data scientist, a model developer, a business developer, etc.) may define engine components 64 constituting a workflow and property specification components 62 for defining parameters for determining characteristics of the engine components 64 according to a certain rule and also may define and edit a component and property specification pair.

Figure 3:
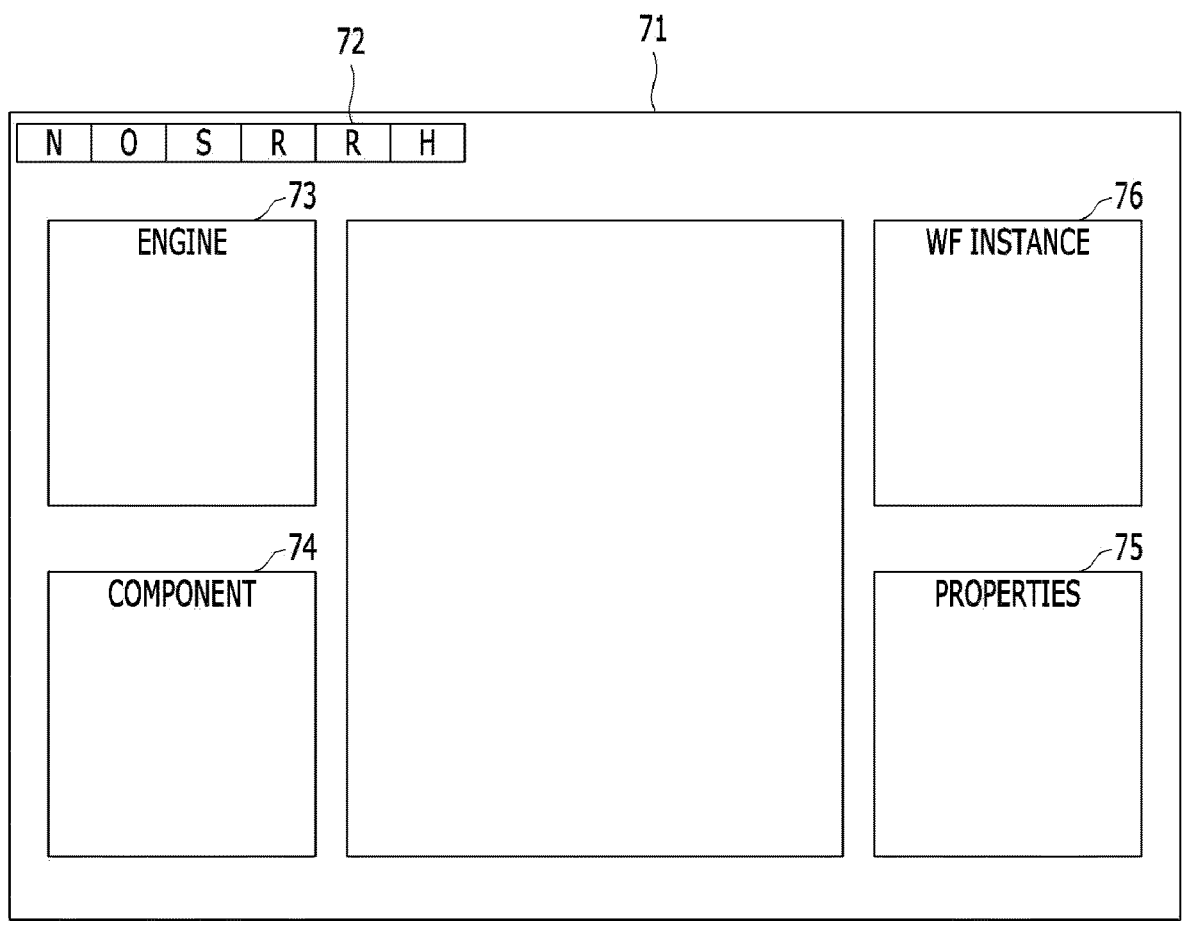
FIG. 3 is an exemplary diagram of a GUI screen for illustrating a configuration of a system definer-editor 70.

FIG. 3 is an exemplary diagram of a GUI screen 71 for illustrating a configuration of the system definer-editor 70. The following description of the GUI screen 71 will be substituted for description of the configuration and the operation of the system definer-editor 70.

The GUI screen 71 contains a function menu 72, an engine type selection unit 73, a component selection unit 74, a component property selection/editing unit 75, and a workflow instance storage/inquiry unit 76.

The function menu 72 is a menu for selecting various functions of the system definer-editor 70, and may be composed of, for example, menu items for selecting functions such as New (write a new workflow), Open (load saved workflow), Save (save workflow), Run (run workflow), Result (view run results), and Help.

The engine type selection unit 73 provides various engine types and allows a user to select a desired one among a variety of engine types. The types of engines include, for example, a real-time streaming processing engine, a batch analysis engine, an on-demand data processing engine, an evaluation engine, a batch data ingestion engine, a stream machine learning prediction engine, an on-demand convergence serving engine, etc.

The component selection unit 74 provides a list of various engine components for each component type to allow a user to select a component type and an engine component for the component type. Table 1 below is an example of a list of component types and engine components, which is provided by the component selection unit 74.

TABLE 1

| Component Type | Engine Component |
| --- | --- |
| Reader | FileReader |
|  | HttpServerReader |

TABLE 1-continued

| Component Type | Engine Component |
| --- | --- |
|  | Kafka Reader |
|  | MongodbReader |
|  | ... |
| Writer | FileWriter |
|  | KafkaWriter |
|  | MongodbReader |
|  | ... |
| Controller | SparkSessionController |
|  | SparkSessionStreamController |
|  | ... |
| Runner | SparkRunner |
|  | TensoflowRunner |
|  | ... |
| Operator | MinMaxScaler |
|  | Aggregator |
|  | ... |

The component property selection/editing unit 75 may provide properties of the engine component selected by the component selection unit 74 to allow a user to ask for, select, and edit the properties.

The workflow instance selection unit 76 displays a list, in which early created workflows are stored. A workflow a user desires to reuse may be selected among the workflows. The selected workflow may be re-edited, or the framework 10 may be requested to perform the selected workflow without re-editing. The reuse may target the entire workflow or may target each single engine included in the workflow to edit or execute the engines.

When the system definer-editor 70 produces a workflow specification file, the file is provided to the system configuration unit 30 of the framework 10 shown in FIG. 1. In this case, the front end 77 may serve to receive the workflow specification and transfer it to the system configuration unit 30.

Returning to FIGS. 1 and 2, the resource management unit 20 functions to manage components needed to perform the workflow. As shown in FIG. 2 in detail, the resource management unit 20 includes:

a property specification component management unit 22 configured to manage (and also update) property specification components 62, in which property specifications for determining characteristics or properties of components of a workflow instance are included, and a list of the property specification components 62; and an engine component management unit 24 configured to manage (and also update) components for execution (i.e., engine components) and a list of the components.

Also, the resource management unit 20 may additionally include a workflow specification instance management unit 26 configured to manage workflow specification instances that have been previously produced and stored. The workflow specification instance management unit 26 stores and manages the workflow specification instances so that the workflow specification instances may be utilized later according to a request from the system definer-editor 70 via, e.g., the workflow instance selection unit 76 of FIG. 3.

In addition, the system configuration unit 30 in FIG. 1 functions to create a component necessary for performing the produced workflow. The system configuration unit 30 configures necessary engine component containers 32 according to a workflow specification passed through the front end 77 to create engine instances.

More specifically with reference to FIG. 2, the system configuration unit 30 includes:
- a workflow property specification assembly unit 34 binds an performance platform configuring workflow specification received from the system definer-editor 70 to the property specification components in order to create a series of property specification components, and
- a workflow configuration unit 36 configures a workflow performing platform by extracting defined engine component information from the assembled property specification components 62 to bind the property specification components 62 and the engine components 64.

The workflow property specification assembly unit 34 binds the workflow specifications for configuring the workflow performing platform to the property specification components 62 to create a series of property specification component instances. Examples of the property specification component 62 created by the workflow property specification assembly unit 34 include Protobuf message object from Google, Case class from Scala, Property object from Java, and the like.

The workflow configuration unit 36 dynamically configures a workflow performance instance unit 50 including a series of engine instances for performing the workflow by binding the engine components 64 constituting the workflow to the property specification components defining parameters for determining the characteristics of the engine components 64 and then by binding instances of the engine components created through the first binding process to the engine containers. In the workflow performance instance unit 50, one or more engines 32 are dynamically created and executed by the workflow configuration unit 36. These engines 32, which are created to perform one workflow, may be deployed and executed as one independent program package on the same computing machine or on computing machines connected to one another over a network or may be packaged in units of a virtual machine and deployed to different physical computing machines.

The system control unit 40 of FIGS. 1 and 2 is a module for playing key roles of the framework of the present invention, for example, for serving to drive the engine instances 32 created by the system configuration unit 30 according to the processing procedure or for terminating the driving of the engine instances 32. Also, the systems control unit 40 controls the execution by driving one or more engines 32 created in the workflow performance instance unit 50 in a manner defined in the workflow property specifications. In other words, when the system control unit 40 makes a workflow performance request to the workflow performance instance unit 50, the workflow is performed. For even any desired domain, this makes it possible to achieve a goal of a workflow produced by a user.

For example, the system control unit 40 may control one or more engines 32 which have multiple types of different data sources and data destinations, so that they are executed in a pipelined manner. Alternatively, the system control unit 40 may control one or more engines 32 which have multiple types of different data sources and data destinations, so that they are executed at the same time. Various types of engine configurations will be described in detail below.

Figure 4:
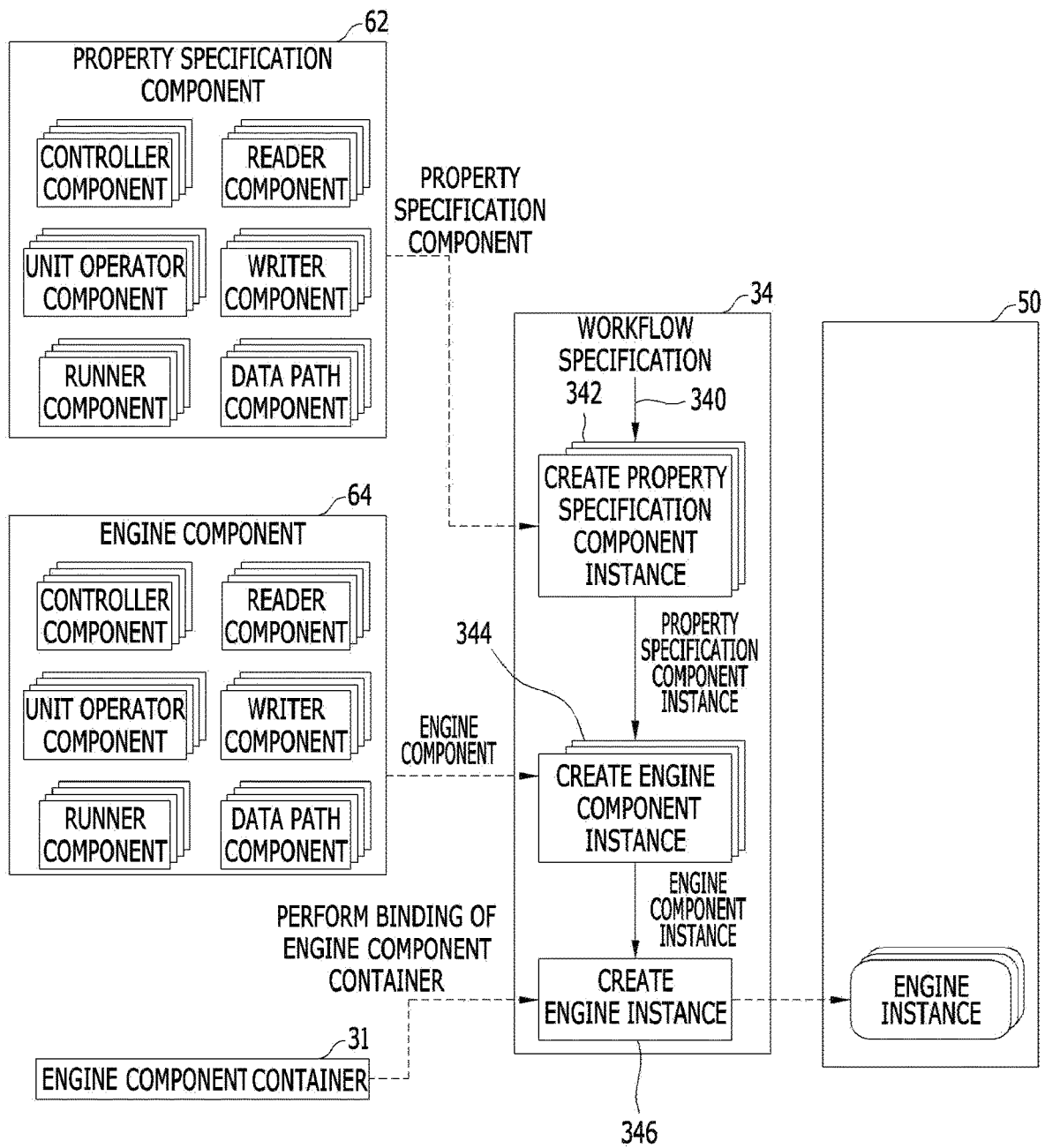
FIG. 4 shows a procedure for configuring an engine configuring a workflow from the specification of the engine.

FIG. 4 shows a procedure for configuring an engine 32 from workflow specifications produced by the system definer-editor 70.

First, the workflow configuration unit 36 of the system configuration unit 30 receives workflow specifications (340) and creates a series of property specification component instances containing property specifications of engine components to configure an engine (342). A property specification component 62 used in this case may be the Protobuf message object from Google, the Case class from Scala, or another "Class" capable of containing a value in a program language.

The workflow configuration unit 36 specifies the created property specification component instances as creator parameters of the engine component 64 and creates engine component instances (344).

When engine instances including a controller, a reader, a runner, a writer, and a unit operator constituting the engine is created, the workflow configuration unit 36 dynamically binds the engine instances to the engine component container 31 by using an engine component container instance as a creator parameter, to crate an engine instance 32 (346). An engine instance 32 are created for each engine definition on the workflow and then executed and managed by the workflow performance instance unit 50.

Through the procedure of FIG. 4, the workflow performance instance is dynamically configured. Here, one engine may be defined and configured in the form of a virtual machine.

FIGS. 5 to 10 show various configuration methods of the engine 32 as examples of the workflow performance instance configured by the workflow configuration unit 36 described with reference to FIG. 1.

Figure 5:
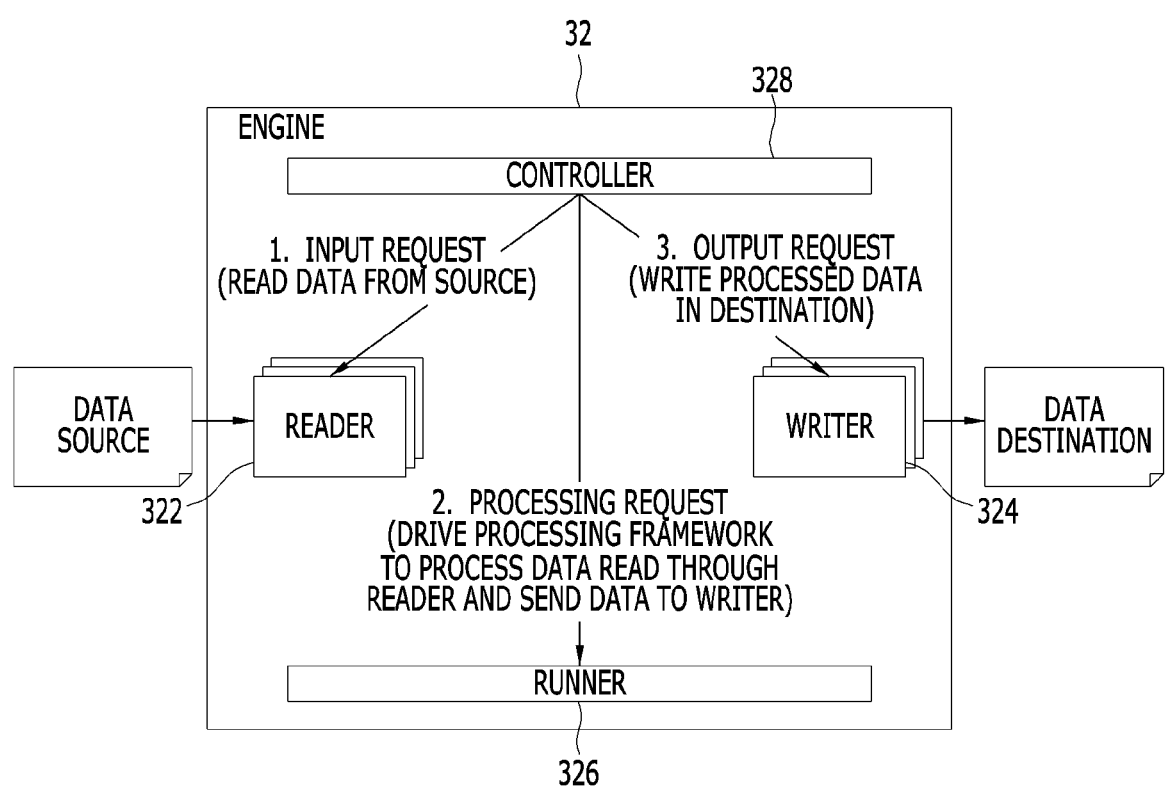
FIG. 5 is a block diagram of an engine as an example of a workflow performance instance configurable by a workflow configuration unit 36 of FIG. 1.

The basic engine 32 shown in FIG. 5 includes a reader 322 configured to bring data from one or more data sources; one or more writers 324 configured to write data internally processed in one or more data destinations; a runner 326 configured to execute a separate execution program or platform for processing input data or manage a session; and a controller 328 configured to input such data through the reader and process the data over the runner and responsible for a series of controls for outputting the processed data.

The controller 328 functions to control a series of processes performed with the reader 322, the writer 324, the runner 326, and a unit operator 323 which will be described below. The controller 328 makes an input request to instruct the reader 322 to read data from a data source, makes a processing request to instruct the runner 326 to drive a processing framework to process the data read through the reader 322 and send the processed data to the writer 324, and makes an output request to instruct the writer 324 to write the processed data in a data destination.

The reader 322 of the engine 32 functions to read data from any type of data storage (not shown) among an in-memory buffer or cache, a file system, a messaging system, a database, and a network driver. Likewise, the writer 324 functions to write data in any type of data storage (not shown) among an in-memory buffer or cache, a file system, a messaging system, a database, and a network driver. The unit operator 323 functions to receive, process, and output data. For example, the unit operator 323 may be an implementation of various data processing functions included in the filtering/integration/reduction/conversion method referred in data mining technology. The runner 326 may be any program or external platforms/frameworks needed to process the data and may include a connector, a controller, a session manager, and the like, each of which may be linked with or may execute one of a deep learning platform such as Tensorflw, Caffe for deep learning analysis, and Spark for big data processing and a knowledge-based processing engine such as Jena.

Figure 6:
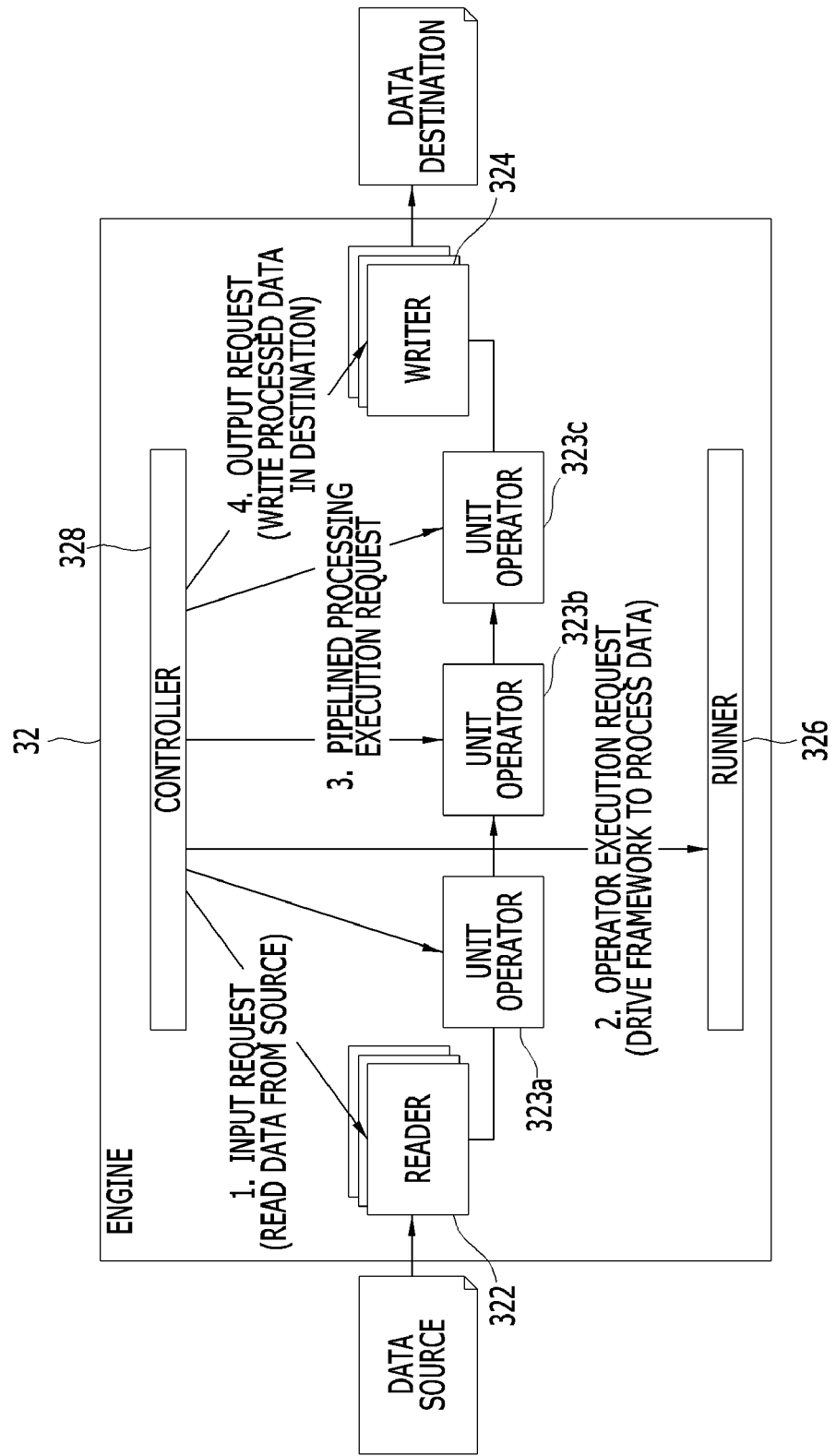
FIG. 6 shows an example of an engine configuration equipped with a unit operator.

On the other hand, when nodes are configured in the order of the reader 322, one or more unit operators 323a to 323c, and the writer 324 as shown in FIGS. 5 and 6, the controller 328 may perform control in a sequential processing manner in which data is sequentially pipelined and transferred to the next node, a simultaneous processing manner in which each node is simultaneously executed, and a simultaneous/sequential processing manner that is a combination of the two manners.

FIG. 6 shows an engine configured to perform, by using one or more consecutive unit operators 323a to 323c in a pipelined manner among the manners for configuring the basic engine 32 of FIG. 5, sequential data processing on a series of processes for processing input data through the controller 328 and then transfer the processed data to the writer 324. The controller 328 makes an input request to instruct the reader 322 to read data from a data source, makes an operator execution request to instruct the runner 326 to drive a data processing framework and process the data read through the reader 322, makes a pipelined processing execution request to each of the unit operators 323a to 323c, and makes an output request to instruct the writer 324 to write the processed data in a data destination. According to the configuration method of FIG. 6, it is possible to easily handle various domains according to their objectives by using a combination of various unit operators. The unit operators 323a to 323c may be implementations of methods for filtering, integration, reduction, and conversion corresponding to techniques for data mining.

Figure 7:
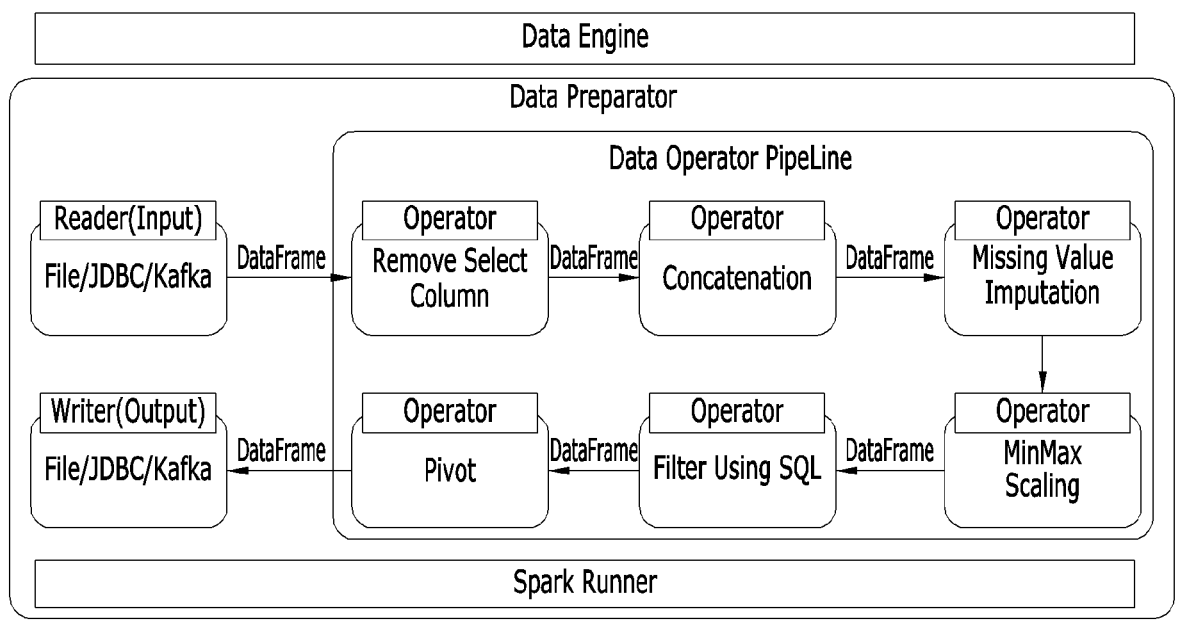
FIG. 7 shows a specific embodiment of a data processing engine shown in FIG. 6.

FIG. 7 shows a specific embodiment of a data processing engine shown in FIG. 6. The data processing engine executes a Spark framework for data processing, reads data through a reader configured to read data from a file, JDBC, Kafka, etc., processes the data through a unit operator for removing a specific column, a concatenation unit operator, a missing value imputation unit operator, scaling unit operator, a filtering unit operator, and a pivot unit operator, and outputs the processed data to the file, JDBC, Kafka, etc. through a writer.

Figure 8:
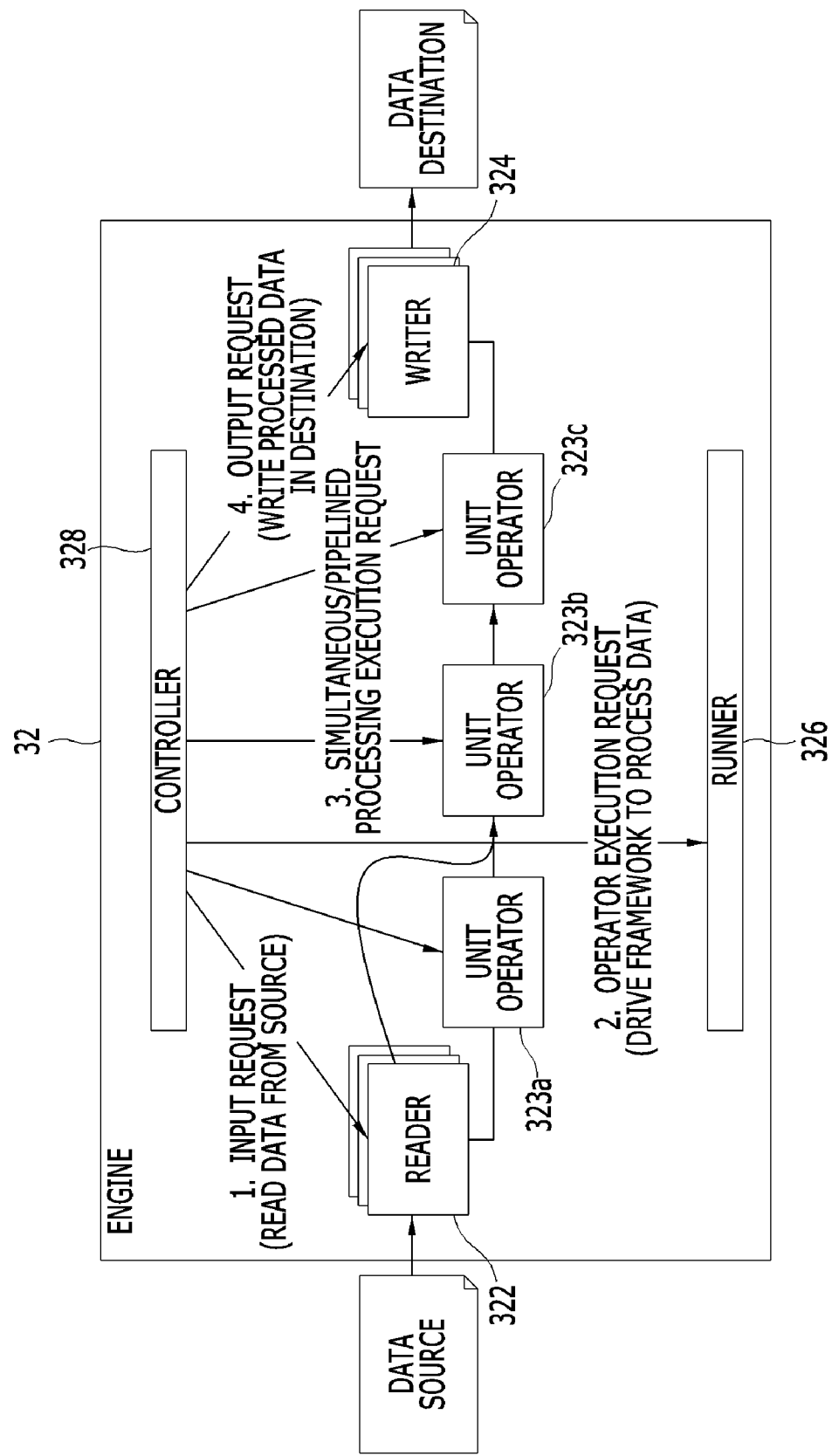
FIG. 8 shows another example of an engine configuration equipped with a unit operator.

FIG. 8 shows a configuration of an engine with a scheme in which the controller 328 of FIG. 6 drives the unit operators 323a to 323c, i.e., an engine with a scheme in which one or more unit operators are driven to simultaneously process data in addition to a scheme in which data is received from the reader 322 and sequentially processed through a series of unit operators in a pipelined manner.

As another embodiment of the engines 32 having the above-described various configurations, the runner 326 may be linked with, or include, various software programs or processing frameworks, such as a deep learning framework such as Caffe or Tensorflow, a big data processing framework such as Spark or Hadoop MapReduce, and an analysis framework such as R or Python.

As still another embodiment, the engine 32 may be equipped with a reader and a writer that use various data paths in the same system as data sources and data destinations. That is, the engine has a reader and a writer that are configured to define, as data sources and data destinations, sources (in the same system) having various logical driver concepts such as an in-memory buffer or cache, a file system, a messaging system, a database, and a network, receive data from the data sources, and output data to the data destinations.

As still another embodiment, the above-described engine 32 may be configured as an engine that uses data paths present in different systems or networks as a data source and a data destination. To this end, network address information, host information, or remote driver information may be included in the settings of the reader and the writer. By separately using different data sources and data destinations for the reader and the writer, it is possible to utilize the engine as a stream processing engine between the destination source and the data destination or as a filter on the data path.

Figure 9:
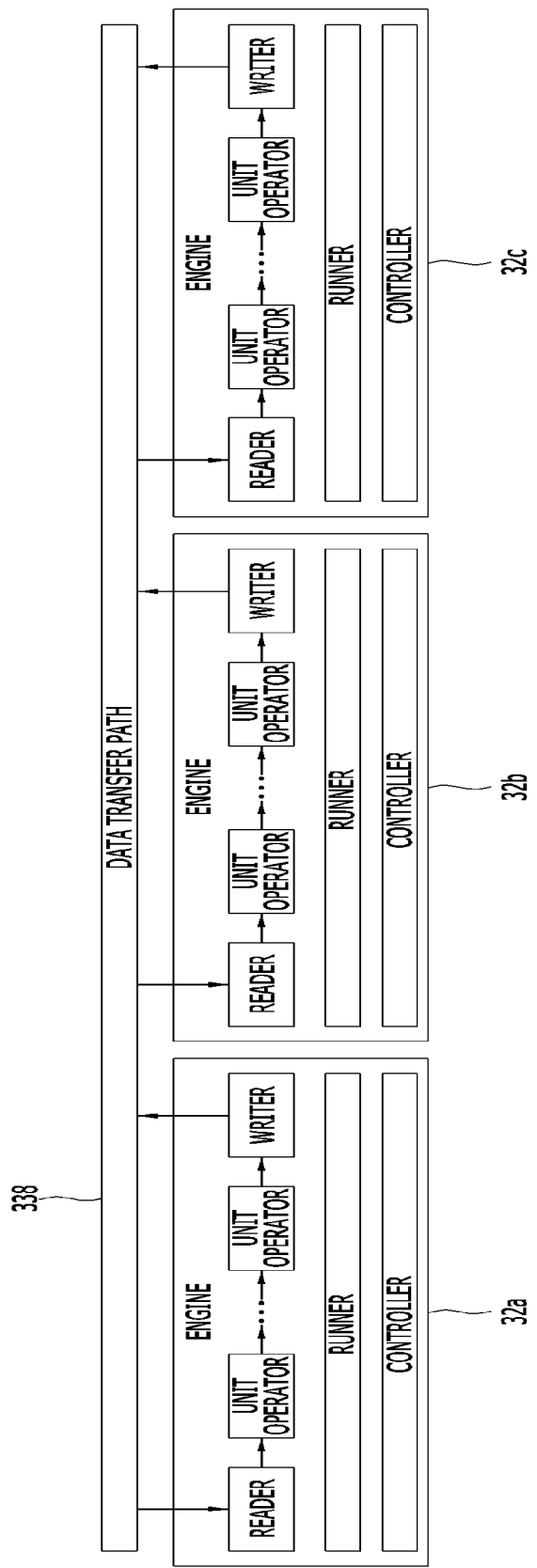
FIG. 9 shows a configuration of a workflow performing system in which one or more engines are connected in a pipelined manner.

FIG. 9 shows an embodiment in which, when there are a plurality of workflow performing engines 32a to 32c, a data transfer path 338 is used in a pipelined manner in which data is output from a data destination of a writer of one engine to a data source of a reader of another engine. Here, the data transfer path 338 may be, for example, Kafka. By using the configuration shown in FIG. 9, it is possible to perform a complicated workflow by cooperation of the engines 32a to 32c for processing different uses of workflow.

In FIG. 9, also, one or more engines 32a to 32c may be under different physical environments (e.g., networks, clusters, etc.) and may have different types of runners. For example, when the first engine 32a cooperates with a runner for processing data and the second engine 32b cooperates with a deep learning framework, it is possible to execute through the data transfer path 338 one workflow for solving a complicated problem in different environments. In this case, the engines may be executed simultaneously, sequentially, or individually at specific time points.

Figure 10:
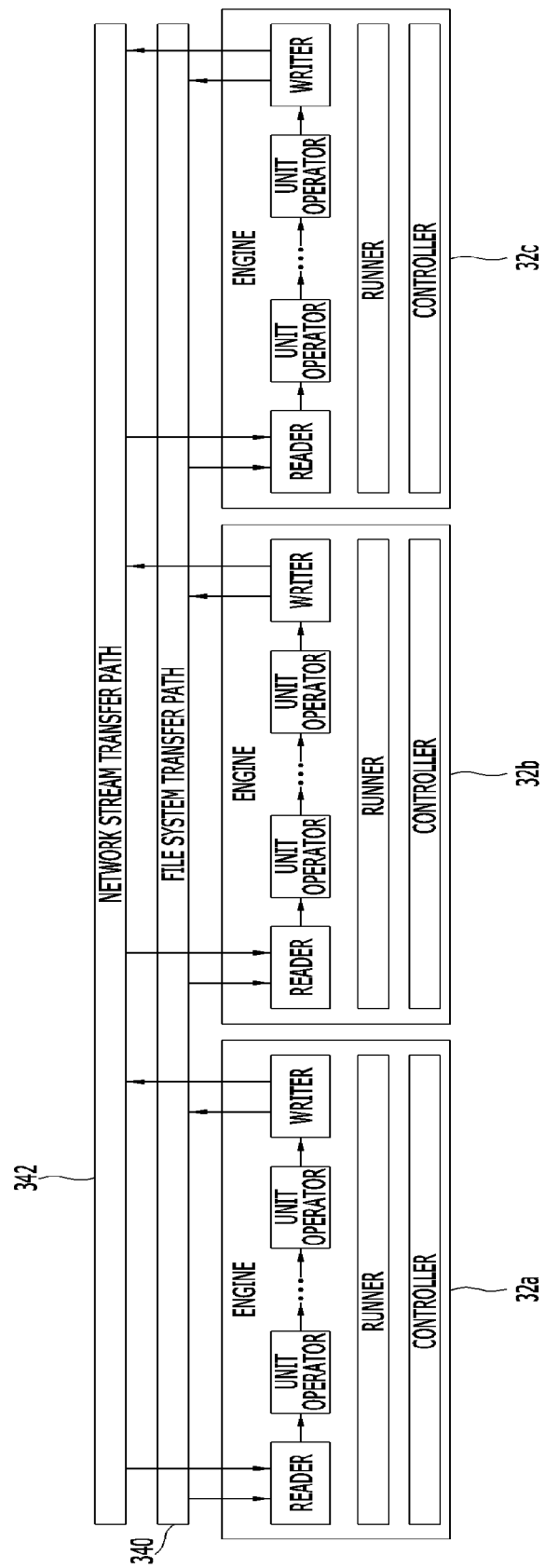
FIG. 10 shows a configuration of a workflow performing system in which one or more engines run through multiple types of data paths.

FIG. 10 shows an example in which a workflow performing system is configured in a pipelined manner in which one or more engines 32a to 32c perform processing using different types of data transfer paths (e.g., a file system transfer path 340 and a network stream transfer path 342) for, respectively, a data source and a data destination. In this case, each engine has a plurality of readers and a plurality of writers. Here, the file system transfer path 340 indicates a batch transfer path, and a network stream transfer path 342 indicates a real-time transfer path. According to the scheme of FIG. 10, it is possible to configure a workflow system having a structure such as Lambda architecture in which both real-time processing and batch processing may be performed.

Specific workflow service scenarios will be introduced to help understand the structure and operation of the above-described framework of the present invention.

Figure 11:
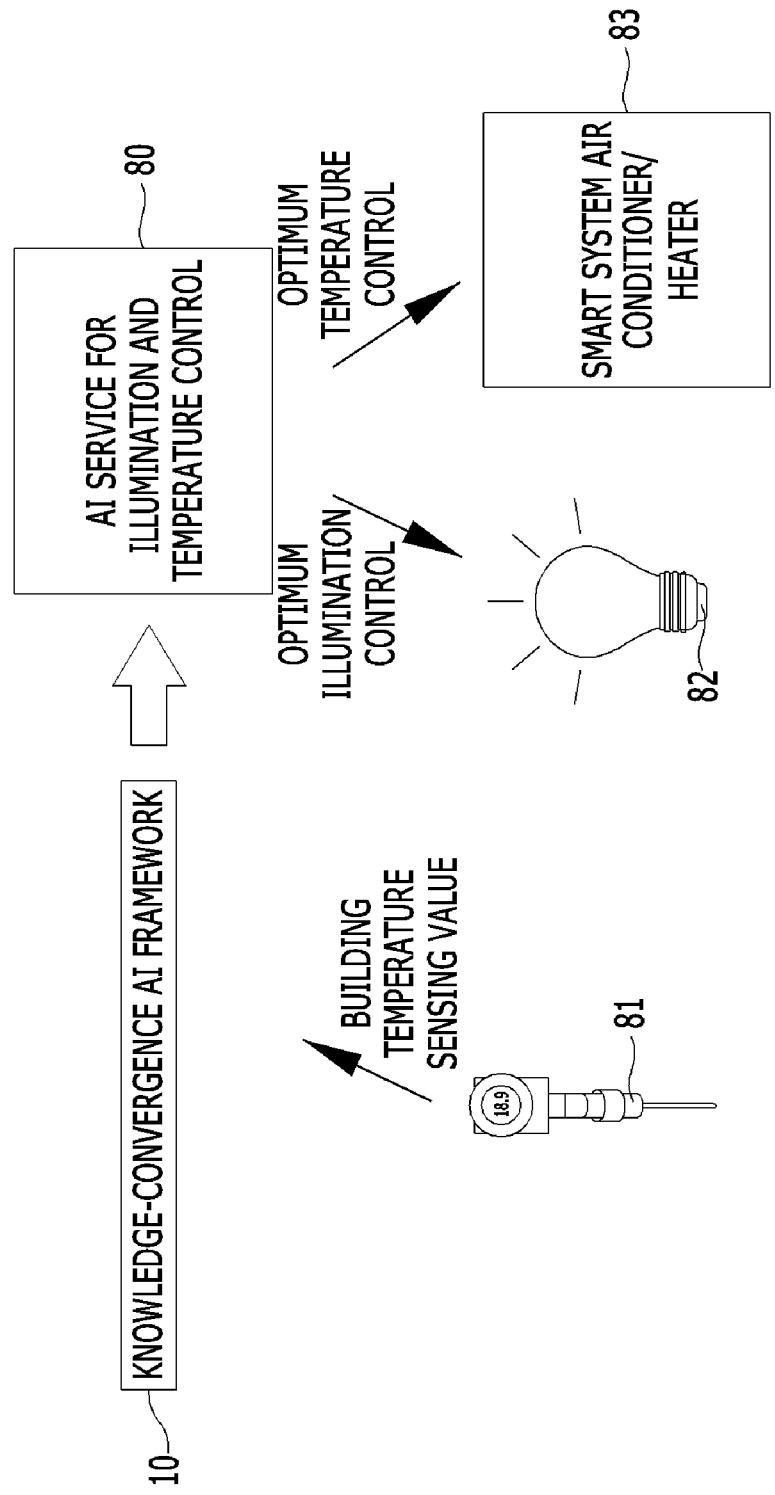
FIG. 11 illustrates an illumination/temperature control workflow service scenario based on the IoT and artificial intelligence.

FIG. 11 illustrates an illumination/temperature control workflow service scenario based on IoT and AI (artificial intelligence). A workflow engine framework 10 receives a temperature sensed value from a temperature sensor 81 in a building and performs a predefined workflow through an engine(s) created in the framework 10 to control a smart bulb 82 to perform optimum illumination control and to control a smart system air conditioner/heater 83 to perform optimum temperature control.

The reference numeral 80 indicates an artificial intelligence illumination and temperature control service of predicting a change in temperature in the future, for example, after one hour, through a predictive model by using data input from the temperature sensor 81; estimating a value for an illumination setting and an air conditioner temperature setting suitable for the predicted temperature; and transmitting illumination setting values for the smart bulb and temperature setting values for the smart system air conditioner/heater 83.

Figure 12:
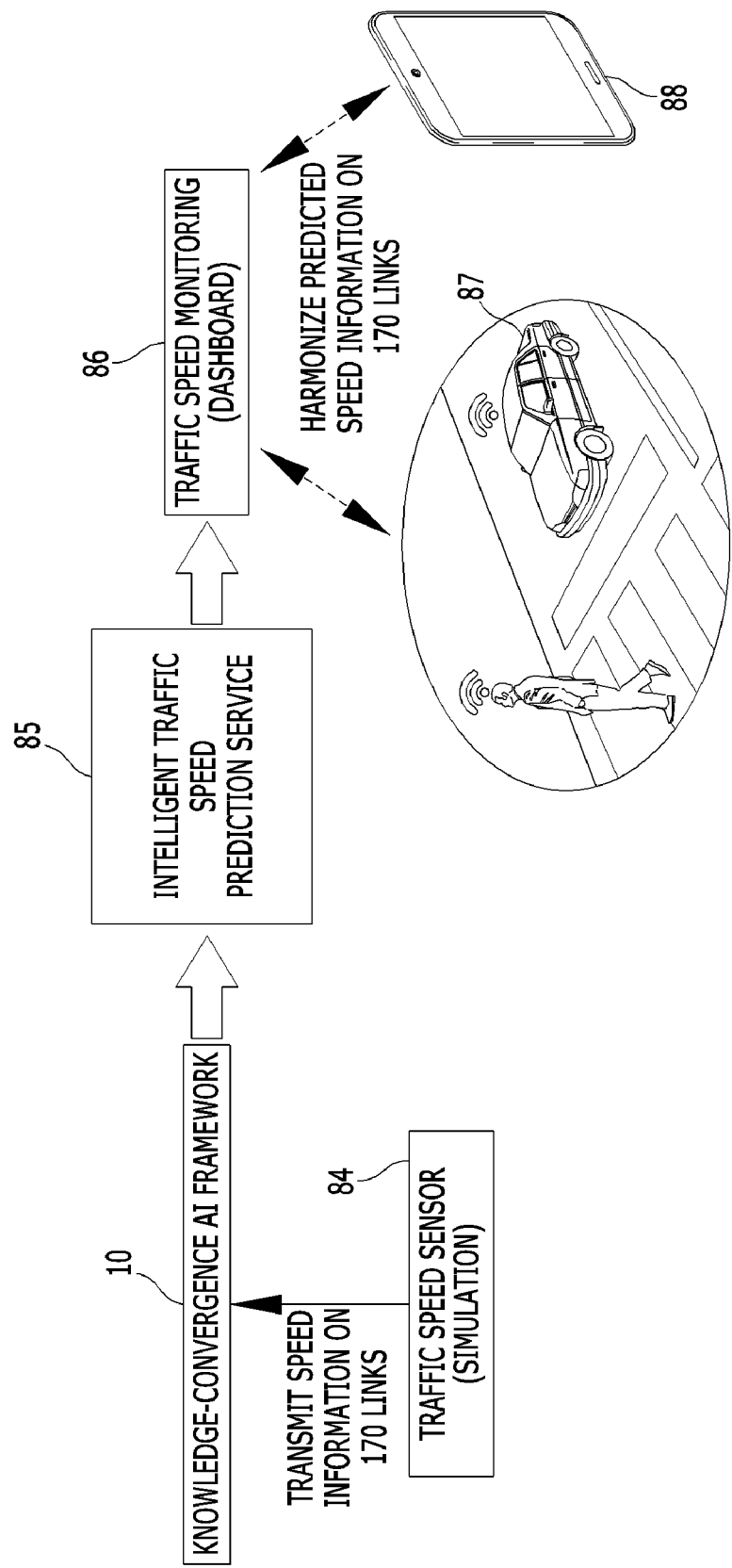
FIG. 12 illustrates a traffic speed monitoring service based on deep learning.

FIG. 12 illustrates a traffic speed monitoring service based on deep learning. A workflow engine framework 10 may receive speed information from traffic speed sensors (simulators) 84 built at a traffic site in a specific area, perform a predefined workflow through an engine(s) created in the framework 10, and provide performance data to an intelligent traffic speed prediction service 85 built in the corresponding area so that the data may be monitored through a car dashboard 87 or a smartphone screen 88. The contents monitored through the car 87 or the smartphone 88 are, for example, traffic speed information displayed on a map of the specific area, as indicated by the reference numeral 86.

Figure 13:
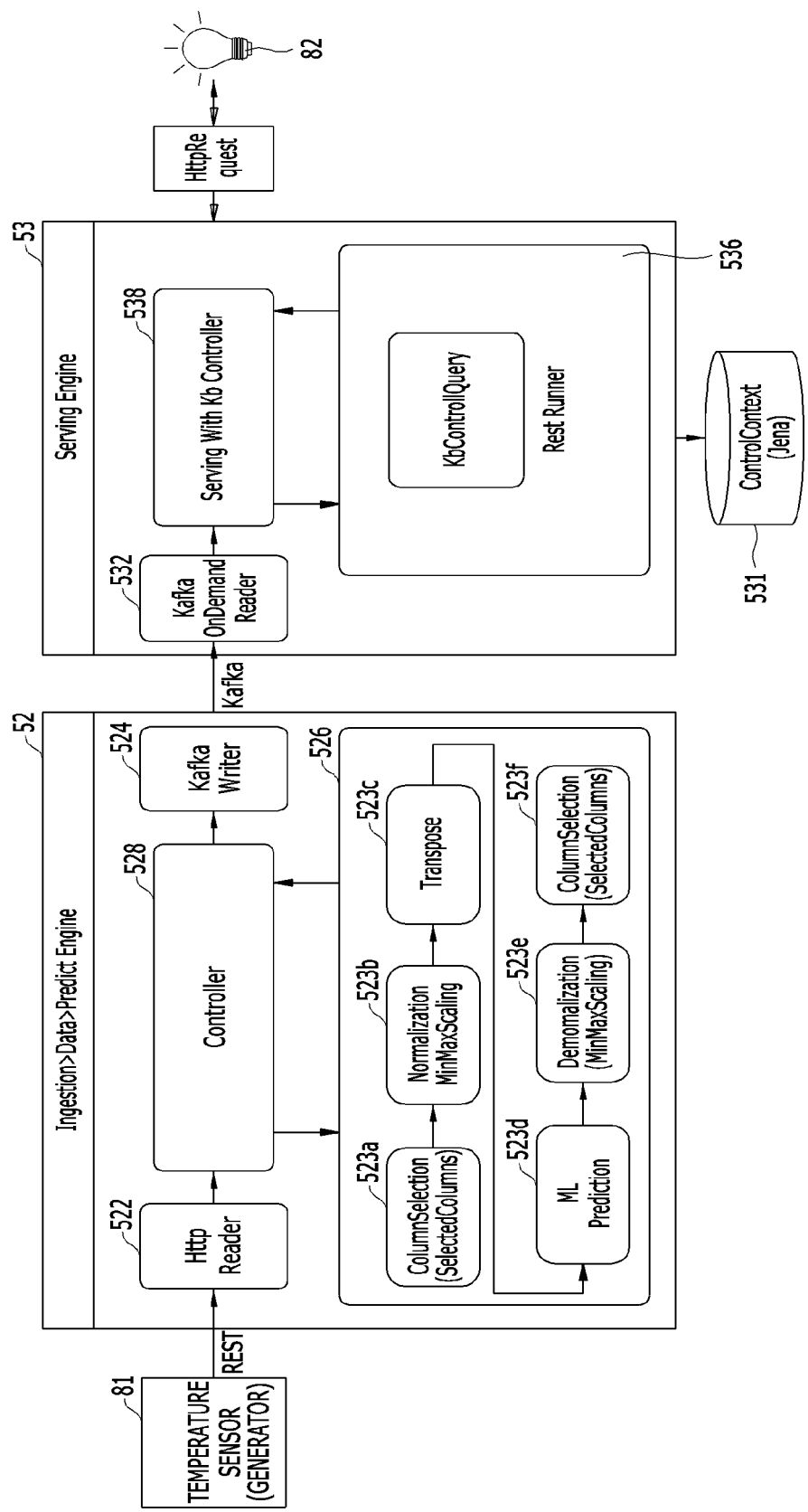
FIG. 13 shows an internal configuration of a workflow engine framework 10 of FIG. 11.

FIG. 13 shows an internal configuration of the workflow engine framework 10 of FIG. 11. The engines created in the workflow engine framework 10 include an ingestion/data/prediction engine 52 and a serving engine 53.

Elements of the ingestion/data/prediction engine 52 are as follows:

522: A stream reader configured to read incoming data by opening a web service port;

528: A controller configured to sequentially control a reader 522, operators 523a to 523f, and a writer 524 when the number of pieces of stream data read is greater than a certain number;

523a: An operator configured to extract a column at which a temperature value is located among the pieces of data;

523b: An operator configured to normalize a value to within a range of a specific value;

523c: An operator configured to convert a column into a row or convert a row into a column;

523d: An operator configured to predict/determine a transferred value by using a specified machine learning model;

523e: An operator configured to return a value to within a range of a specific value for denormalization;

523f: An operator configured to extract a specific column including a label value among several values created as a result of prediction;

524: A writer configured to write a final value in a stream engine (e.g., Kafka); and

526: A runner configured to provide an environment in which an operator may be executed.

Elements of the serving engine 53 are as follows:

532: A reader configured to read values from a stream engine whenever necessary;

536: A web server configured to open a specific web port and wait for a request from an end user (Rest Runner); and

538: A controller configured to control a series of flows to read a processing result value of the ingestion/data/prediction engine 52 through the reader 532, search a database for an optimum value, and transmit a response when a request is received through the specific web port on the web sever running on the Rest Runner 536.

A temperature sensed value of the temperature sensor 81 is input to the ingestion/data/prediction engine 52 as a REST signal and processed through a plurality of operators designed by the system definer-editor 70. A prediction result value is read from a storage and transferred to the serving engine 53. According to the temperature sensed value of the temperature sensor 81, the smart bulb 82 is controlled for automatic illumination control.

Figure 14:
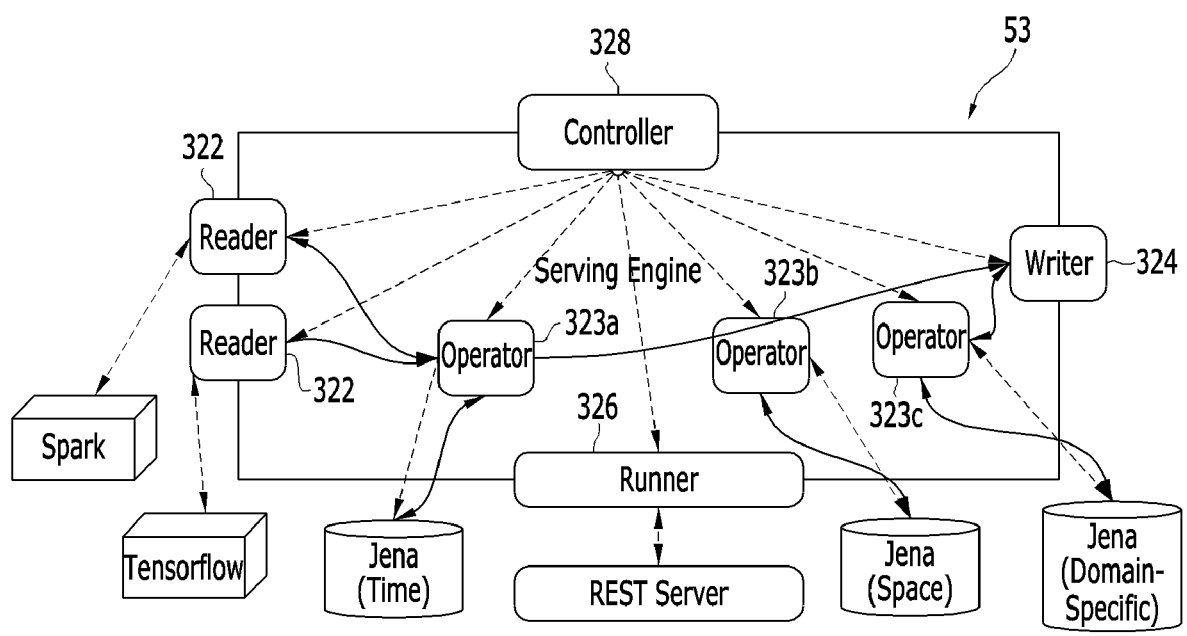
FIG. 14 shows an example of a configuration of a serving engine for providing intelligent service as an engine for providing a service to a client or a user.

FIG. 14 shows an example of a configuration of a serving engine for providing intelligent service as an engine for providing a service to a client or a user. A reader 322, a plurality of pipeline operators 323a to 323c, a writer 324, a runner 326, and a controller 328 are similar to those described with reference to FIG. 8. However, the serving engine of FIG. 14 is configured to serve for service execution in the workflow services of FIGS. 11 and 13. In FIG. 14, Spark, Tensoflow, Jena (time), REST Server, Jena (space), and Jena (domain-specific) are shown, which are external systems cooperating with each of the engine components.

A controller of the serving engine may configure the engine by using a reader configured to read processed data from an engine having a runner such as Spark or read processed data from an engine having a deep learning framework such as TensorFlow as a runner, an operator configured to perform ontology-based inference using the value, and a runner configured to service the result through the REST interface, thus providing intelligent service.

Figure 15:
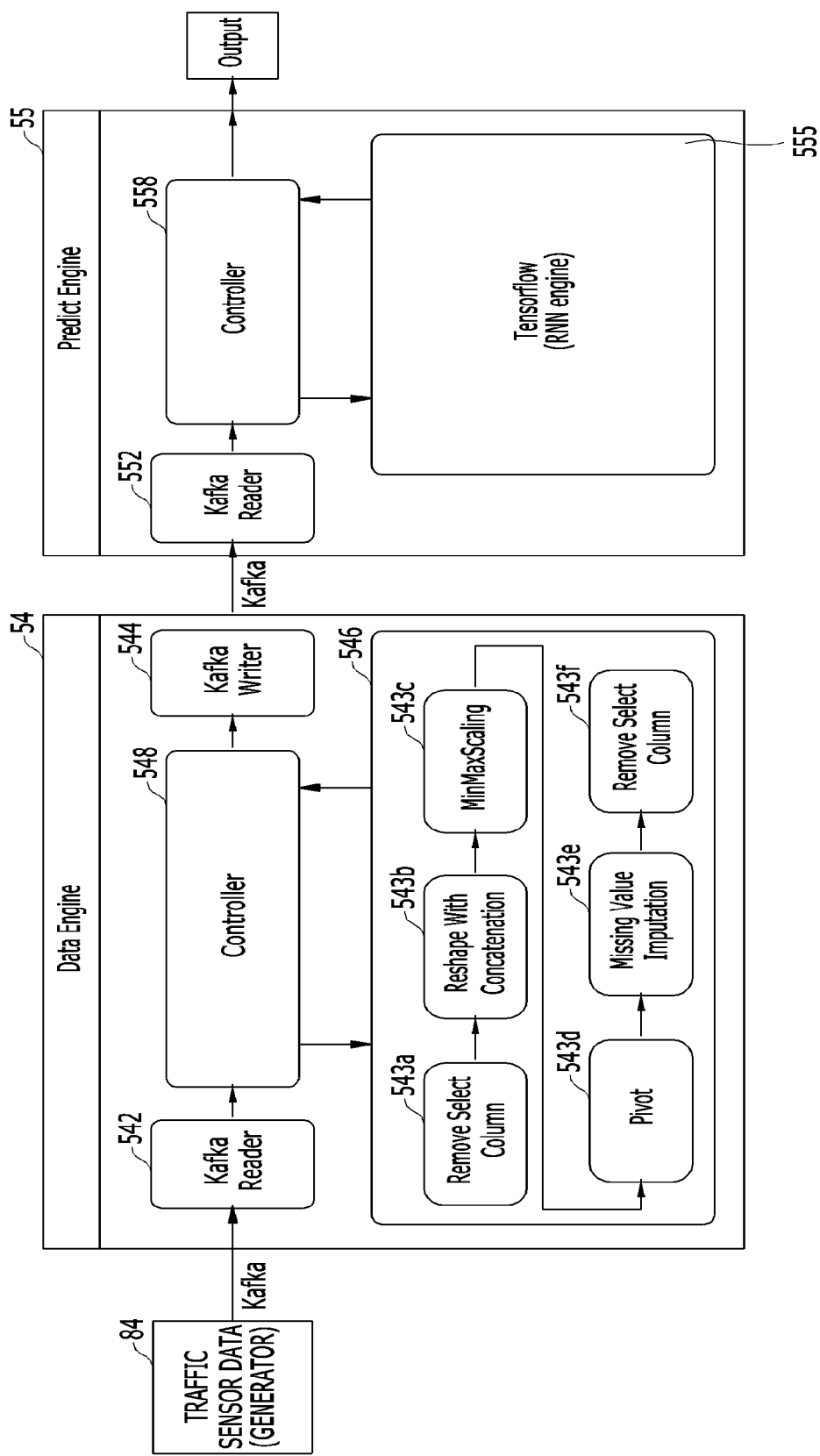
FIG. 15 shows an internal configuration of a workflow engine framework 10 of FIG. 12.

FIG. 15 shows an internal construction of the workflow engine framework 10 of FIG. 12. The engines created in the workflow engine framework 10 include: a data engine 54 configured to, when time/speed/TRV is in realtime transmitted every 5 minutes from a traffic center 84 having 1382 links, read the time/speed/TRV, pre-process 24 time-series data for each link for the purpose of Tensorflow RNN operation, and transmit the pre-processed data; and a prediction engine 55 configured to receive 24 time-series data for each link for the purpose of Tensorflow RNN operation and output a predicted value corresponding to 15 minutes later.

Similar to those described with reference to FIGS. 5 to 8, the data engine 54 includes a reader 542, a controller 548, a runner 546, and operators 543a to 543f. The prediction engine 55 also includes a reader 552 and a controller 558, similar to those described with reference to FIGS. 5 to 8. However, Tensorflow 555 configured to perform recurrent neural network (RNN)-based prediction is included instead of a runner.

Figure 16:
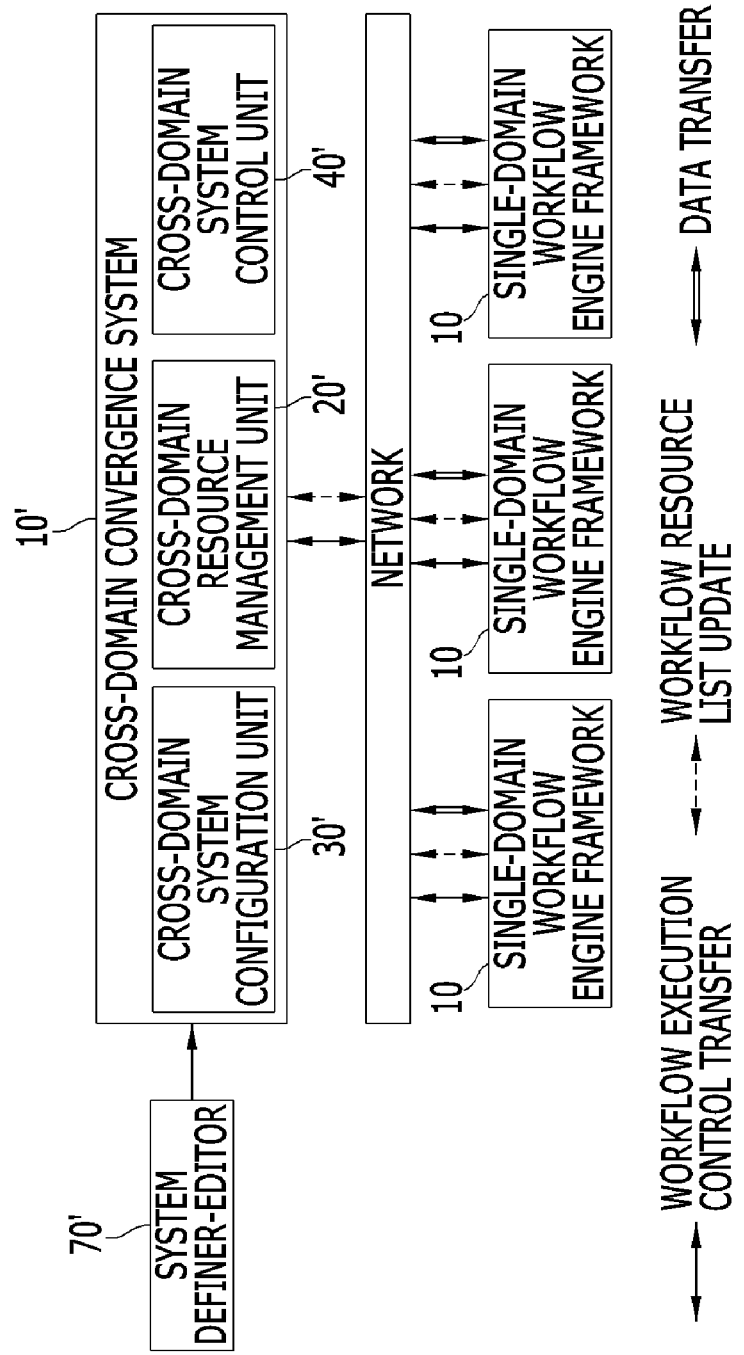
FIG. 16 shows an example of a configuration of a cross-domain workflow engine framework.

FIG. 16 shows a method of dynamically configuring a cross-domain adaptive workflow engine framework system by cooperatively connecting the above-described plurality of single-domain adaptive workflow engine frameworks 10 to one another over a network. When the workflow configuration of FIG. 1 is intended for a cross domain, a cross-domain convergence system 10' for generally managing and controlling one or more single-domain adaptive workflow engine frameworks 10 is additionally included to implement a cross-domain adaptive workflow engine framework.

The cross-domain convergence system 10' fundamentally has a structure and functions similar to those of the single-domain workflow engine framework 10 of FIG. 1 or FIG. 2 and serves to integrate and layer various domains. The cross-domain convergence system 10' manages resources related to cross-domain workflow performing, allocates some of the cross-domain workflow to each domain as one workflow, and performs the workflow on a framework of each domain. Accordingly, the cross-domain convergence system 10' may include a cross-domain resource management unit 20', a cross-domain system configuration unit 30', and a cross-domain system control unit 40'.

When a user uses the system definer-editor 70' of the above-described concept to define a cross-domain related workflow and produce workflow specifications containing requests for which sensor data will be collected, which model will be selected, and where a created engine(s) will be appropriately deployed, the cross-domain convergence system 10' determines a domain to which a necessary engine(s) is/are to be deployed according to the workflow defined in the system definer-editor 70'. In this case, criteria for determining the engine deployment consider, for example, network load, performance, distance within a network, which domain is optimal for use of a specific engine, and whether components for executing an engine are present in a corresponding domain.

The cross-domain resource management unit 20' periodically receives a report for workflow resources from the resource management unit 20 of the plurality of single-domain workflow engine frameworks 10 (see FIG. 1 or 2), and updates and manages the workflow resources. For example, the workflow resources may include one or more of component resources for workflow performing, network connection information, hardware resource information, spec information of a virtual machine, configuration information of a system, available device information of a system, and available statuses. Also, the cross-domain resource management unit 20' periodically updates and maintains available components, hardware, network information, and device information for each domain through resource information received from each domain. The resources managed by the resource management unit 20' may include, for example, a list of engine components for each domain, data for cost estimation, reliability between domains, etc.

In order to handle a cross-domain workflow instance specification received from the system definer-editor 70', the cross-domain system configuration unit 30' divides the single cross-domain workflow instance specification into a plurality of single-domain workflow specifications with reference to locations of, and a connection method for, available resources received from the cross-domain resource management unit 20', and deploys the single-domain workflow specifications to the single-domain workflow engine frameworks 10. Each of the single-domain workflow engine frameworks 10 dynamically configure the engine(s) assigned to each domain In order to control starting, ending or the like of execution of a workflow performing system created by each of the single-domain workflow engine frameworks 10, that is, one or more engines deployed to the domains, the cross-domain system control unit 40' requests a system control unit 40 of each of the single-domain workflow engine frameworks 10 to control the execution, so that the workflow performing system may be operated and finished on the cross-domain.

The workflow engine framework 10 of each domain dynamically configures an engine allocated to each domain, and then drives the engine according to the execution request from the cross-domain system control unit 40' to perform execution. In this case, data transfer between engines may be directly performed through a network driver as described with reference to FIG. 10, and may be performed by using one or more of various data paths such as a messaging system such as a distributed message queue and other distributed file systems.

The system control unit 40 of each single-domain workflow engine framework 10 transmits signals indicating, for example, the progress or completion of the engines back to the cross-domain system control unit 40' of the cross-domain convergence system 10'.

In order to keep the resource information up to date, the cross-domain resource management unit 20' requests each single-domain workflow engine framework 10 for the resource information received from each domain, that is, available components and hardware, network information, device information for each domain, etc. In addition, while in performing cross-domain workflow, the cross-domain system configuration unit 30' divides the cross-domain workflow into one or more domain workflow in order to place an optimal engine workflow on the workflow engine frameworks 10 of one or more domains. To this end, the cross-domain system configuration unit 30' requests the cross-domain resource management unit 20' for the latest resource information on each single domain workflow engine framework 10, and completes the task of division into one or more domain workflows by using a process for determination of engines to be configured on each single-domain workflow engine frameworks 10 in accordance with the optimal engine deployment policy (See step 260 in FIG. 17). Next, the cross-domain system configuration unit 30' sends each divided domain workflow to each of the single domain workflow engine frameworks 10 to dynamically configure a system that can execute the engine(s) for performing the cross-domain workflow on one or more domains.

Each single-domain workflow engine framework 10 registers a list of its own resources in the cross-domain convergence system 10' and periodically requests updating of the list. Here, the resource list may be a list of component resources for workflow performing and also may correspond to network connection information, hardware resource information, spec information of a virtual machine, configuration information of a system, available device information of a system, available statuses, and the like.

Figure 17:
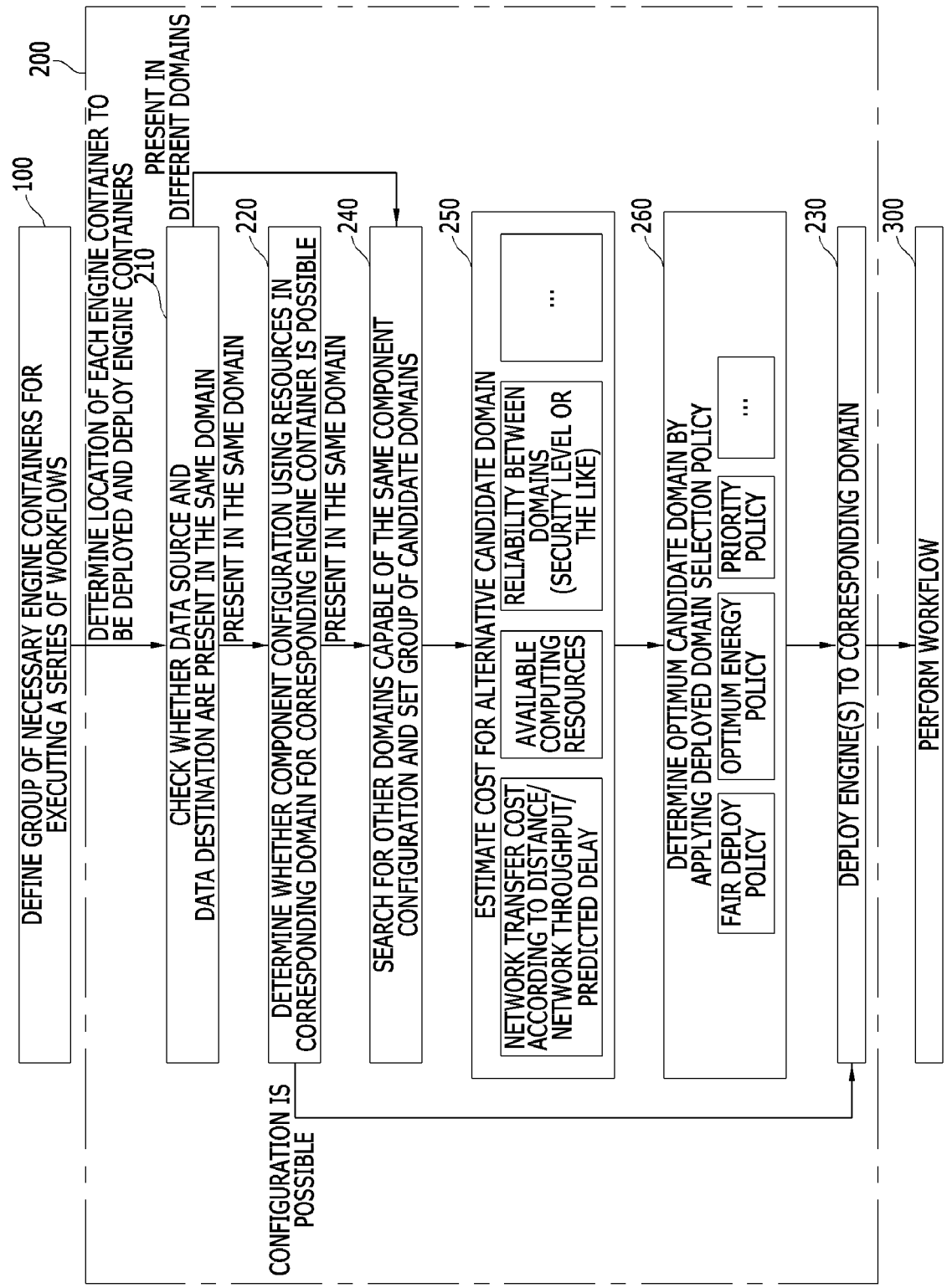
FIG. 17 shows a procedure of performing a cross-domain workflow.

FIG. 17 shows procedure, in which the cross-domain convergence system 10' of FIG. 16 receives, effectively deploys, and performs a workflow specification. In this case, the workflow may be a single-domain adaptive workflow or a cross-domain adaptive workflow depending on issues to be addressed or applications.

First, the system definer-editor 70' determines a workflow through a workflow creation procedure and defines workflow specifications including a group of engine component containers for creating engines constituting the workflow (100). When the workflow specifications are received from the system definer-editor 70', the cross-domain convergence system 10' determines to which domain an engine component container(s) set in the workflow specifications will be deployed and proceeds to a deployment process (200). When the specifications for an engine(s) needed for the workflow is deployed to a domain(s), all preparations for performing the workflow for a single domain or a cross-domain are complete and the workflow is finally executed (300).

The process 200 in which the cross-domain system configuration unit 30' of the cross-domain convergence system 10' determines a deployment location of each engine component container and deploying the engine component containers will be described in detail as follows.

First, the cross-domain convergence system 10' checks whether an initial source (i.e., the location of data to be collected by an engine, for example, a specific DB, a sensor location, etc.) and a final destination (e.g., a data source for another engine, or a storage location) of data needed for each engine are present in the same domain (210). In this case, the data source and the data destination may be IoT device, structured data storage such as a database, a file system, or the like, and also may be a web service terminal.

When the data source and the destination are present in the same domain, the cross-domain convergence system 10' inquires the resource management unit about, and makes a determination about, whether a series of engines can be configured starting from an initial data source to a final destination by using resources in the corresponding domain (220). When the engine configuration is possible (e.g., all engine components capable of the engine configuration are present in a resource registry of the corresponding domain), the cross-domain convergence system 10' deploys an engine specification so that the engine is dynamically configured in the corresponding domain (230), and thus allows the workflow to be performed.

When the data source and the data destination of the engine do not belong to the same domain in Step 210 or when it is determined in Step 220 that the configuration of the engine component container by using the resources in the corresponding domain is possible, the process proceeds to step 240 for searching for another domain capable of the same component configuration (i.e., searching the resource management unit) and determining a group of alternative candidate domains.

When the alternative candidate domain group is determined, the cross-domain convergence system 10' performs cost estimation to determine an alternative domain from the candidate domain group (250). In this case, the cost may be calculated by combining one or more of the followings: reliability between domains, the amount of available computing resources, and a network transfer cost such as a distance over network topology, a network throughput, an expected latency, or the like.

Next, the cross-domain convergence system 10' applies a deployment domain selection policy(s) to select an optimum deployable domain (260). In this case, the domain selection policy may be a process allocation policy that allocates the same amount or ratio of resources to each domain, an optimum energy policy that considers energy efficiency, a priority policy that prioritizes domains for allocation, or the like. The step for the cost calculation and the step for policy selection are not sequential.

When specifications for all engines needed for the workflow is deployed to a corresponding domain(s) (230), all preparations for performing the workflow for the corresponding domain or a cross-domain are completed and the workflow is finally performed (300). Execution instructions of the system control unit 40' in the cross-domain convergence system 10' are transmitted to the system control unit 40 of each single-domain framework 10 via a control channel to execute the workflow.

To further understand the cross-domain adaptive workflow engine framework of FIGS. 16 and 17, a specific related scenario and system configuration will be additionally described with reference to FIGS. 18 to 20.

Figure 18:
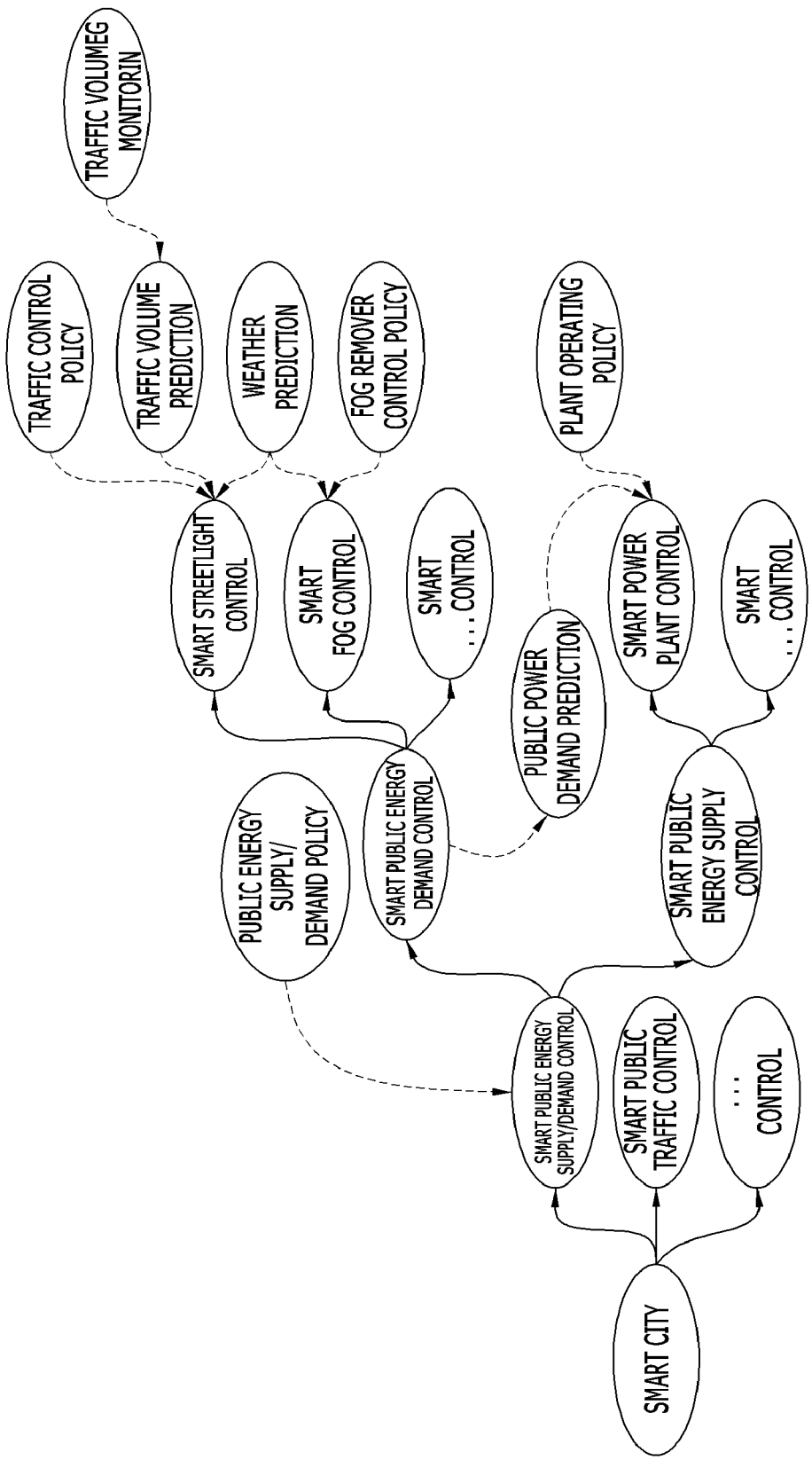
FIG. 18 illustrates a scenario for achieving a smart city.

FIG. 18 illustrates a scenario for achieving a smart city. First, a smart city can be achieved through optimum (smart) public energy supply and demand control, public traffic control, and optimal control in other applications. The optimum public energy supply and demand control may be achieved through optimum public energy demand control and supply control according to a public energy supply and demand policy. Here, the smart public energy demand control may be achieved through optimum streetlight control, optimum fog control (e.g., control of a fog removal device), and other optimum public device control. The optimum streetlight control may be achieved by referring to an optimum road traffic control policy according to a predicted road traffic volume and predicted weather conditions. The road traffic volume prediction may be achieved by referring to a result obtained by monitoring a traffic volume for each road.

Figure 19:
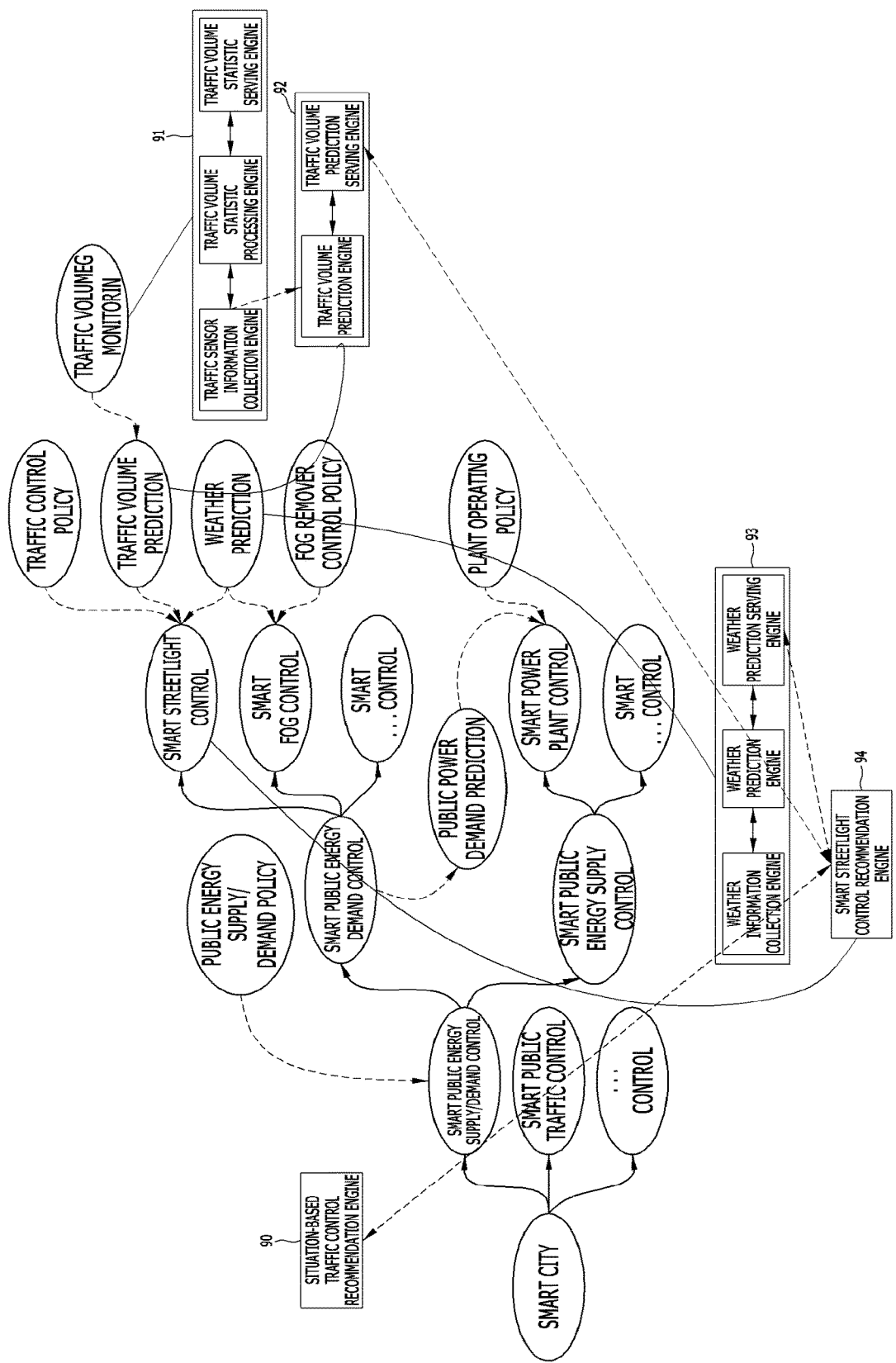
FIG. 19 shows an embodiment of a workflow engine framework configured to achieve the smart city of FIG. 18.

FIG. 19 shows an embodiment of a cross-domain workflow engine framework configured to achieve the smart city of FIG. 18.

First, the monitoring of the traffic volume may be performed by an engine framework through a road traffic volume monitoring workflow 91 including an engine for collecting sensed data from various traffic sensors, a traffic volume statistic processing engine for reading the sensed data collected by the collection engine and performing operation for traffic volume statistics such as a total volume or an average volume, and a traffic volume statistic serving engine for outputting a traffic volume statistic processing result in response to an external request. This thus makes it possible to configure a desired traffic volume monitoring system.

Next, the road traffic volume prediction may define and perform a road traffic volume prediction workflow 92 including a traffic sensor information collection engine of the road traffic volume monitoring workflow 91, a traffic volume prediction engine for processing the collected sensed information into input data needed for the prediction, reading the processed data, and performing machine learning-based prediction, and a traffic volume prediction serving engine for outputting the predicted result in response to an external request. This thus makes it possible to dynamically configure a desired road traffic volume prediction system.

The weather prediction may define and perform a weather prediction workflow 93 including a weather information collection engine configured to collect and appropriately process weather information, a weather prediction engine configured to predict weather on the basis of a machine learning model, and a weather prediction serving engine configured to serve a weather prediction result. This thus makes it possible to configure a desired weather prediction system.

The road traffic control policy may define and perform a road traffic control workflow 90 including a situation-based road traffic control recommendation engine configured to extract an optimum road traffic control policy by utilizing a knowledge-base or machine learning through a rule-based inference or recommendation operation using context corresponding to a specific situation as an input. This thus makes it possible to configure a system for achieving the objective.

The smart streetlight control may define and perform a smart streetlight control workflow 94 configured to create a smart streetlight control recommendation engine that responds to an external request by including an operation for inquiring the described-above traffic volume prediction serving engine and the weather prediction serving engine of a road traffic volume prediction result and of a weather prediction result and including an operation for providing the results to the situation-based road traffic control recommendation engine to infer necessary road traffic control. This thus makes it possible to configure a system for achieving the objective.

Other scenarios shown in FIG. 18 but not described may configure respective workflows in a similar way, thus dynamically configuring a system for achieving their own objectives.

Figure 20:
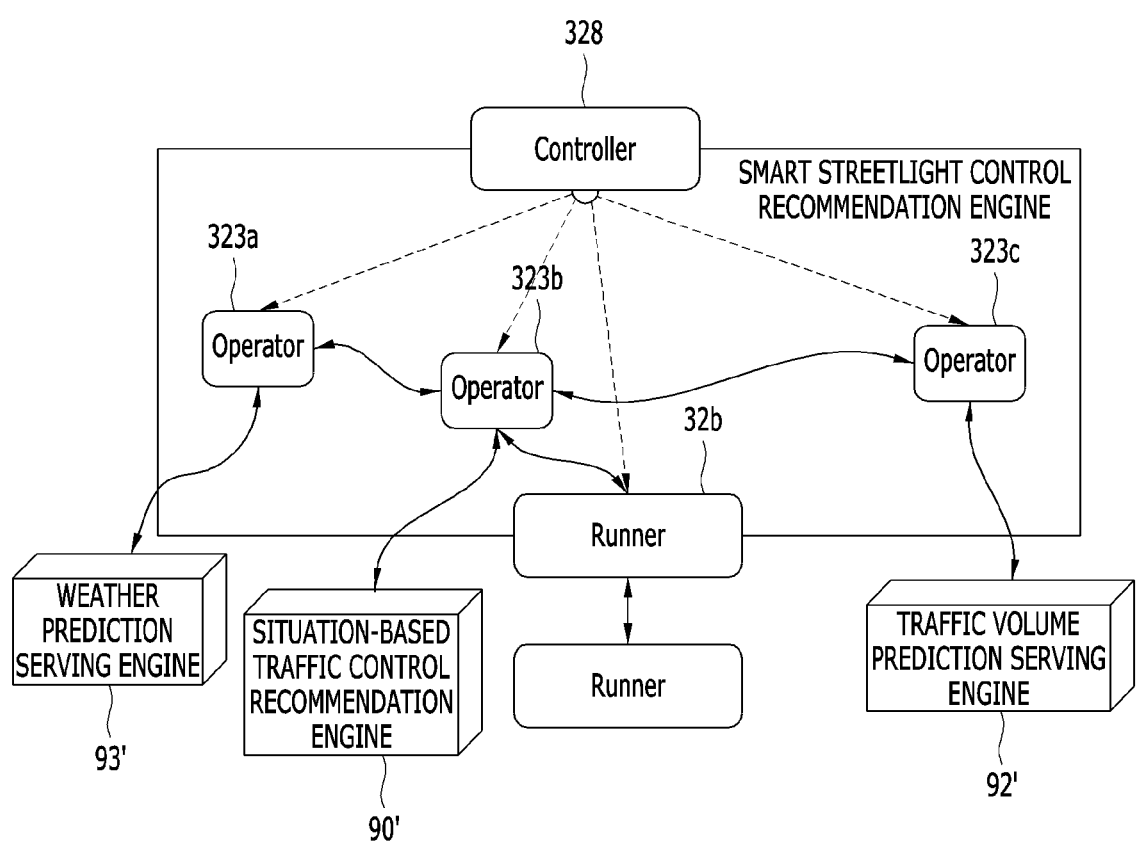
FIG. 20 shows an embodiment of a configuration of a smart streetlight control recommendation engine of a workflow 94 shown in FIG. 19.

FIG. 20 illustrates an embodiment of a configuration of the smart streetlight control recommendation engine of the smart streetlight control workflow 94 among the scenarios shown in FIG. 19. The smart streetlight control recommendation engine includes a runner component 326 configured to drive a REST server 325 for responding to an external request; an operator 323a configured to, when a request is received by the REST server 325, inquire a weather prediction engine 93' through an operator for inquiring about a weather prediction result and bring the prediction result; an operator 323c configured to ask a traffic volume prediction engine 92' about, and bring, a future road traffic volume prediction result; an operator 323b configured to receive a result acquired by each operator, create situation information, inquire a situation-based road traffic control recommendation engine 90' by using the created situation information to obtain road traffic control suitable for the situation, extract a streetlight control policy from the road traffic control, and transfer the extracted streetlight control policy to the REST server 325; and a controller 328 configured to control a logical flow relationship between the runner 326 and each their operators.

Returning back to the performing procedure of the cross-domain workflow of FIG. 17, a supplementary description will be made for each of the scenarios with respect to a cost estimation (250), which is a basis for determination of an alternative candidate domain, and an optimum candidate domain determination (260) in the procedure for determining a group of component containers needed to perform a workflow (100) and determining deployment locations of, and deploying, the engine component containers (200).

For the situation-based road traffic control recommendation engine in the road traffic control workflow 90, the recommendation result is directly related to the streetlight control recommendation, such that the engine is deployed according to a weighting policy preferentially considering reliability between domains.

For the sensed data collection engine, the traffic volume statistic processing engine, and the traffic volume statistic serving engine in the road traffic volume monitoring workflow 91, the engines are deployed according to a weighting policy preferentially considering available computing resources and network transfer costs upon engine deployment for the purpose of real-time monitoring.

For the traffic volume prediction engine and the traffic volume prediction serving engine of the road traffic volume monitoring workflow of the road traffic volume prediction workflow 92, prediction should be performed using a collection result of the collection engine, and thus the engines are deployed preferentially considering a cost for networking with a domain to which the collection engine is deployed.

In the weather prediction workflow 93, since the weather information is not very important for security, the engines are deployed preferentially considering available computing resources.

In the smart streetlight control workflow 94 including the smart streetlight control recommendation engine, since engines to be inquired are distributed to different domains and contain important information, the engines are deployed according to a weighting policy preferentially considering reliability between domains.

Through the above configurations and processes, it is possible to implement and manage components by using a machine learning model and a big data analysis model that have been developed to solve a specific problem in a real-time large-data analysis service or the like that performs analysis combining IoT, big data, and machine learning. In addition, it is possible to implement a single-domain adaptive or a cross-domain adaptive workflow engine framework capable of dynamically reusing the components so that a performance platform for solving similar problems in various work domains or target domains may be easily configured.

Through the systematic configuration of the engine components, it is possible to create and perform a workflow suitable for an application and for an objective corresponding to each domain and also possible to easily apply to another domain to create and perform a workflow suitable for the other domain. That is, it is possible to easily configure a domain adaptive workflow engine framework that may dynamically reuse engine components so that a performance platform for solving similar problems in various work domains or target domains may be easily configured. Also, by additionally including a cross-domain knowledge convergence brain system, it is possible to configure a cross-domain adaptive workflow engine framework. Furthermore, it is possible to implement and manage components by using a machine learning model and a big data analysis model that have been developed to solve a specific problem in a real-time large-data analysis service that performs analysis combining IoT, big data, and machine learning.

In an environment where various artificial intelligence services or applications are required, by developing and equipping additional necessary components or reusing previously developed and equipped components without developing an individual solution for each application, it is possible to implement a framework for configuring/executing a set of workflow performing engines that satisfy a new workflow.

The above-described subject matter of the present invention is to be considered illustrative and not restrictive, and it should be understood that numerous other modifications and embodiments can be devised by those skilled in the art without departing from the spirit and scope of the present invention. Accordingly, the embodiments of the present invention are to be considered descriptive and not restrictive of the present invention, and do not limit the scope of the present invention. The scope of the invention should be to be construed by the appended claims, and all technical ideas within the scope of their equivalents should be construed as being included in the scope of the invention.

What is claimed is:

1. A workflow engine data processing system comprising:
one or more computing machines that include:
  a resource manager configured to manage resources including engine components and workflow property specification components needed to perform a workflow;
  a system configurator configured to create an engine by assembling the workflow property specification components and combining the engine components needed for performing the workflow to configure a necessary engine component container according to a workflow specification; and
  a system controller configured to drive, in a manner defined in a workflow property specification and to control the execution, one or more engines created by the system configurator.

2. The workflow engine data processing system of claim 1, further comprising wherein the one or more computing machines further include a performance instance unit in which an engine configured as a combination of engine components created by the system configurator is stored.

3. The workflow engine data processing system of claim 1, wherein the resource manager comprises:
  a property specification component manager configured to manage property specification components including property specifications for determining component properties of the workflow instance; and
  an engine component manager configured to manage engine components for the execution.

4. The workflow engine data processing system of claim 3, wherein the resource manager further comprises a workflow specification instance manager configured to manage a workflow specification instance that has been previously produced and stored.

5. The workflow engine data processing system of claim 1, wherein the system configurator comprises:
  a workflow property specification assembler configured to bind the workflow specifications to the workflow property specification components to create property specification components; and
  a workflow configurator configured to extract defined engine component information from the assembled workflow property specification components and bind the workflow property specification components and the engine components to configure an engine to configure a workflow performing platform.

6. The workflow engine data processing system of claim 5, wherein the workflow configurator further comprises a workflow performance instance unit configured to bind the engine components and the workflow property specification components according to rules for the engine components configuring the workflow and the workflow property specification components defining parameters for determining characteristics of the engine component and store the engine for performing the workflow.

7. The workflow engine data processing system of claim 1,
wherein the workflow specifications are defined through a system definer-editor and submitted to the system configurator, and
wherein the system definer-editor comprises:
an engine type selector configured to provide various engine types and enable the user to select a desired one from among the engine types;
a component selector configured to provide a list of various engine components for each component type so that the user selects a component type and an engine component for the type; and
a component property selector/editor configured to provide properties of the engine component selected in the component selector and enable the user to ask about, select, and edit the properties.

8. The workflow engine data processing system of claim 1, wherein the engine comprises:
a reader configured to bring data from one or more data sources;
one or more unit operators configured to receive data from the reader and process the received data;
one or more writers configured to output internally processed data to one or more data destinations;
a runner configured to execute a separate program or platform for processing input data or manage a session; and
a controller configured to input such data through the reader, process the data over the runner, and perform controls for outputting the processed data.

9. The workflow engine data processing system of claim 8,
wherein when nodes are configured in a sequential order of the reader, the unit operators, and the writers,
the controller performs control in a manner selected from a sequential processing in which data is sequentially pipelined and transferred to a next node, a simultaneous processing in which each node is simultaneously executed, and a simultaneous/sequential processing that is a combination of the two manners.

10. The workflow engine data processing system of claim 8, wherein the one or more unit operators receive data from the reader and process the data according to sequential pipelining and also are driven to simultaneously processing.

11. The workflow engine data processing system of claim 8,
wherein one or more workflow performing engines are included in the workflow engine framework, and between the one or more engines a data transfer path is used in a pipelined manner.

12. The workflow engine data processing system of claim 11, wherein the one or more engines are located under different physical environments and include different kinds of runners.

13. The workflow engine data processing system of claim 11, wherein the data transfer path include different types of data transfer paths.

* * * * *